US012563423B2

(12) United States Patent
Li et al.

(10) Patent No.: US 12,563,423 B2
(45) Date of Patent: Feb. 24, 2026

(54) MONITORING FOR DOWNLINK REPETITIONS

(71) Applicant: QUALCOMM INCORPORATED, San Diego, CA (US)

(72) Inventors: Qiaoyu Li, Beijing (CN); Chao Wei, Beijing (CN); Jing Lei, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/913,404

(22) PCT Filed: May 14, 2020

(86) PCT No.: PCT/CN2020/090337
§ 371 (c)(1),
(2) Date: Sep. 21, 2022

(87) PCT Pub. No.: WO2021/226956
PCT Pub. Date: Nov. 18, 2021

(65) Prior Publication Data
US 2023/0111395 A1 Apr. 13, 2023

(51) Int. Cl.
*H04W 24/08* (2009.01)
*H04L 1/08* (2006.01)
(Continued)

(52) U.S. Cl.
CPC .............. *H04W 24/08* (2013.01); *H04L 1/08* (2013.01); *H04L 5/1469* (2013.01); *H04W 72/0446* (2013.01); *H04W 72/23* (2023.01)

(58) Field of Classification Search
CPC . H04W 24/08; H04W 72/0446; H04W 72/23; H04L 1/08; H04L 5/1469; H04L 5/14
See application file for complete search history.

(56) References Cited

U.S. PATENT DOCUMENTS

2016/0330698 A1* 11/2016 Loehr ................. H04W 52/241
2016/0338010 A1 11/2016 Rico Alvarino et al.
(Continued)

FOREIGN PATENT DOCUMENTS

CN 105210433 A 12/2015
CN 105792101 A 7/2016
(Continued)

OTHER PUBLICATIONS

Alcatel-Lucent., et al., "Coverage Enhancement for RACH Messages", 3GPP TSG-RAN WG1 Meeting #76, R1-140153, Prague, Czech Republic, Feb. 10-14, 2014, Feb. 14, 2014 (Feb. 14, 2014), The Whole Document, 5 Pages, pp. 1, 3-4.
(Continued)

*Primary Examiner* — Jamal Javaid
(74) *Attorney, Agent, or Firm* — Holland & Hart LLP

(57) ABSTRACT
Methods, systems, and devices for wireless communications are described. A base station may identify a slot format configuration, such as a time division duplex (TDD) slot format configuration, and one or more downlink repetition configurations corresponding to a number of downlink repetitions for a user equipment (UE). The base station may transmit the configurations to the UE. The UE may determine that the number of downlink repetitions and the configured slot format satisfy, or fail to satisfy, a validation rule for monitoring the number of downlink repetitions. The UE may monitor, or refrain from monitoring, the number of repetitions based on whether the validation rule is satisfied.

8 Claims, 19 Drawing Sheets

(51) Int. Cl.
  *H04L 5/14* (2006.01)
  *H04W 72/0446* (2023.01)
  *H04W 72/23* (2023.01)

(56)     References Cited

U.S. PATENT DOCUMENTS

2017/0311319 A1 * 10/2017 Lee ......................... H04L 1/189
2019/0342898 A1   11/2019 Nam et al.
2020/0136791 A1   4/2020 You et al.

FOREIGN PATENT DOCUMENTS

| | | |
|---|---|---|
| CN | 109842952 A | 6/2019 |
| WO | WO-2018170670 A1 | 9/2018 |
| WO | WO-2019184943 A1 | 10/2019 |
| WO | WO-2019217912 A1 | 11/2019 |
| WO | WO-2020030013 A1 | 2/2020 |

OTHER PUBLICATIONS

International Search Report and Written Opinion—PCT/CN2020/090337—ISA/EPO—Feb. 18, 2021 (204287WO1).
Supplementary European Search Report—EP20935677—Search Authority—The Hague—Jan. 4, 2024 (204287EP).

* cited by examiner

Slot Format Configuration 225

Downlink Repetition
Configuration 230

DL Repetitions 310-a 305-a

315

320

315-a 300-a

DL Repetitions 310-b 305-b

315

320

315-b 300-b

Downlink Symbol 330

Flexible Symbol 335

Uplink Symbol 340

610

615

620

605

600

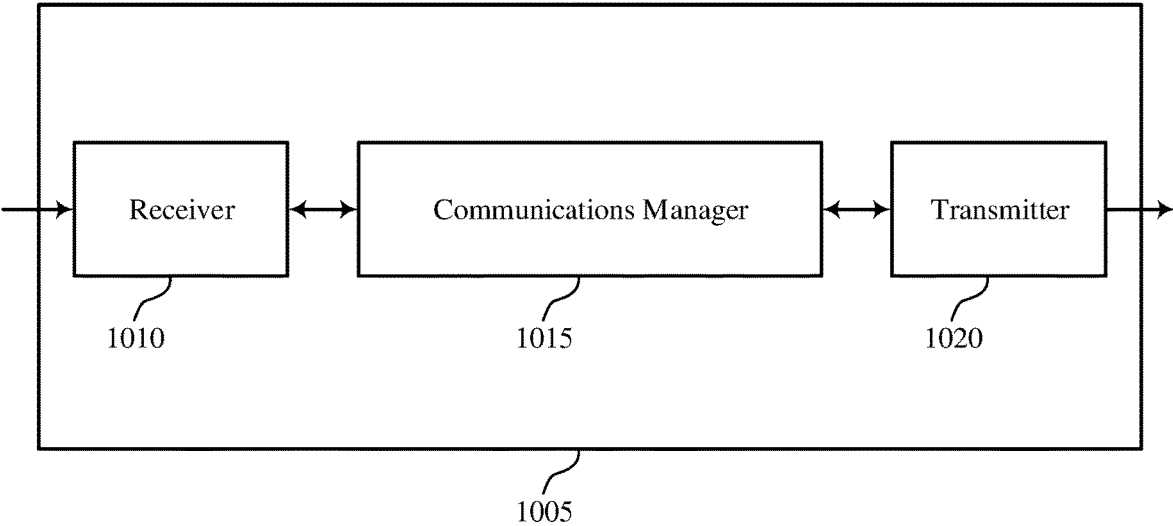
Receiver
1010
Communications Manager
1015
Transmitter
1020
1005
1000
FIG. 10

Communications Manager

Slot Format Configuration
Component

1120

Repetition Configuration
Component

1125

Validation Rule Component

1130

Repetitions Component

1135

1115

Receiver

1110

Transmitter

1140

1105

1100

130

1350

115  115

Network Communications Manager

1315

Transceiver

1320

Antenna

1325

Communications Manager

1310

Memory

Code

1335

1330

Inter-station Communications Manager

1345

Processor

1340

1305

105    105

1300

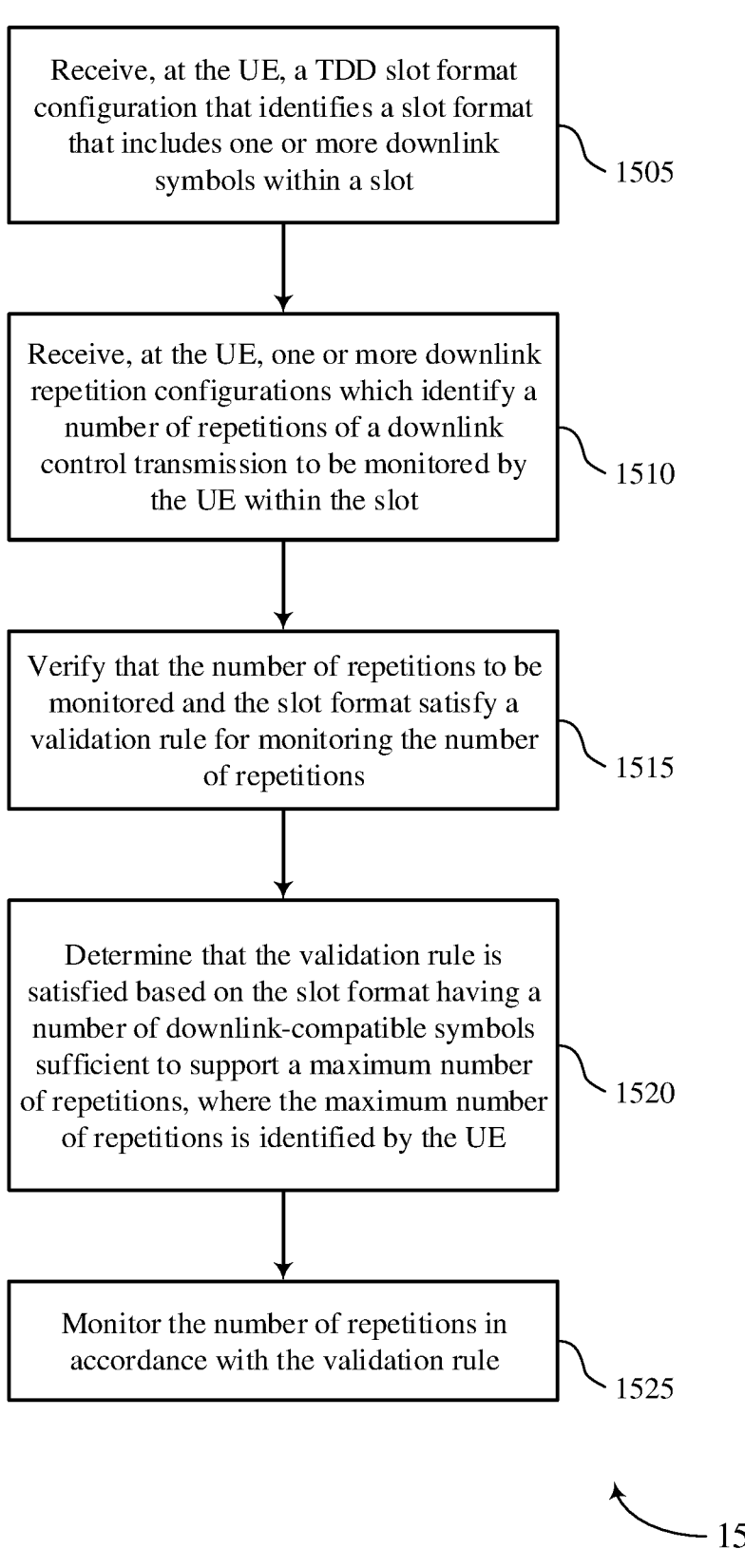

Receive, at the UE, a TDD slot format configuration that identifies a slot format that includes one or more downlink symbols within a slot

1505

Receive, at the UE, one or more downlink repetition configurations which identify a number of repetitions of a downlink control transmission to be monitored by the UE within the slot

1510

Verify that the number of repetitions to be monitored and the slot format satisfy a validation rule for monitoring the number of repetitions

1515

Determine that the validation rule is satisfied based on the slot format having a number of downlink-compatible symbols sufficient to support a maximum number of repetitions, where the maximum number of repetitions is identified by the UE

1520

Monitor the number of repetitions in accordance with the validation rule

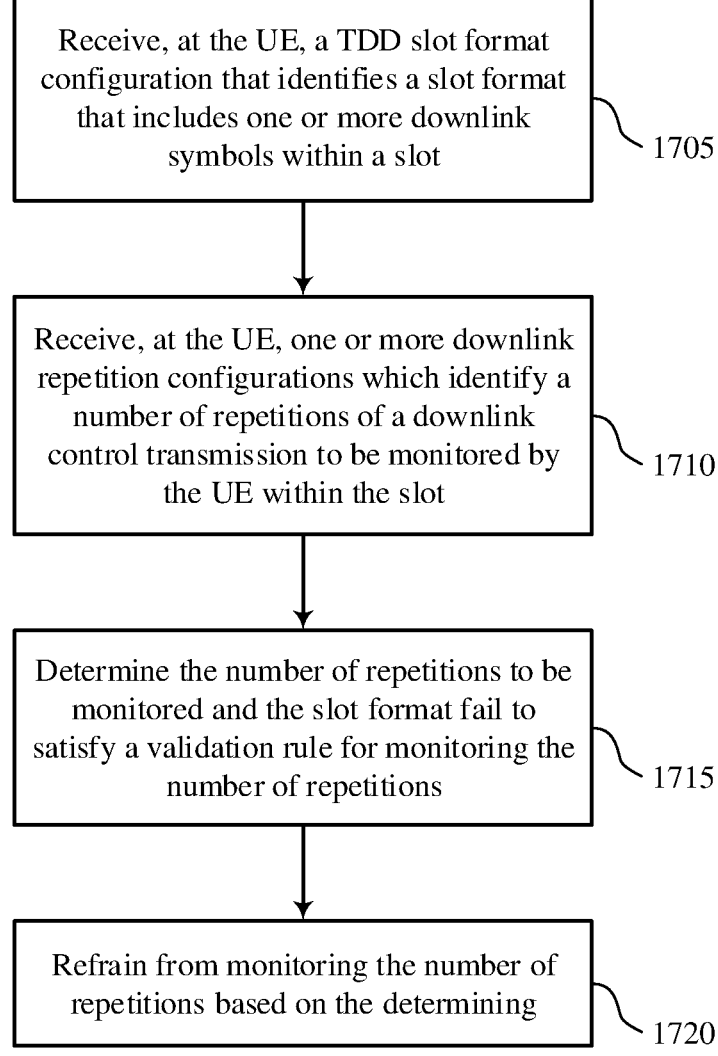

Receive, at the UE, a TDD slot format configuration that identifies a slot format that includes one or more downlink symbols within a slot    1705

Receive, at the UE, one or more downlink repetition configurations which identify a number of repetitions of a downlink control transmission to be monitored by the UE within the slot    1710

Determine the number of repetitions to be monitored and the slot format fail to satisfy a validation rule for monitoring the number of repetitions    1715

Refrain from monitoring the number of repetitions based on the determining    1720

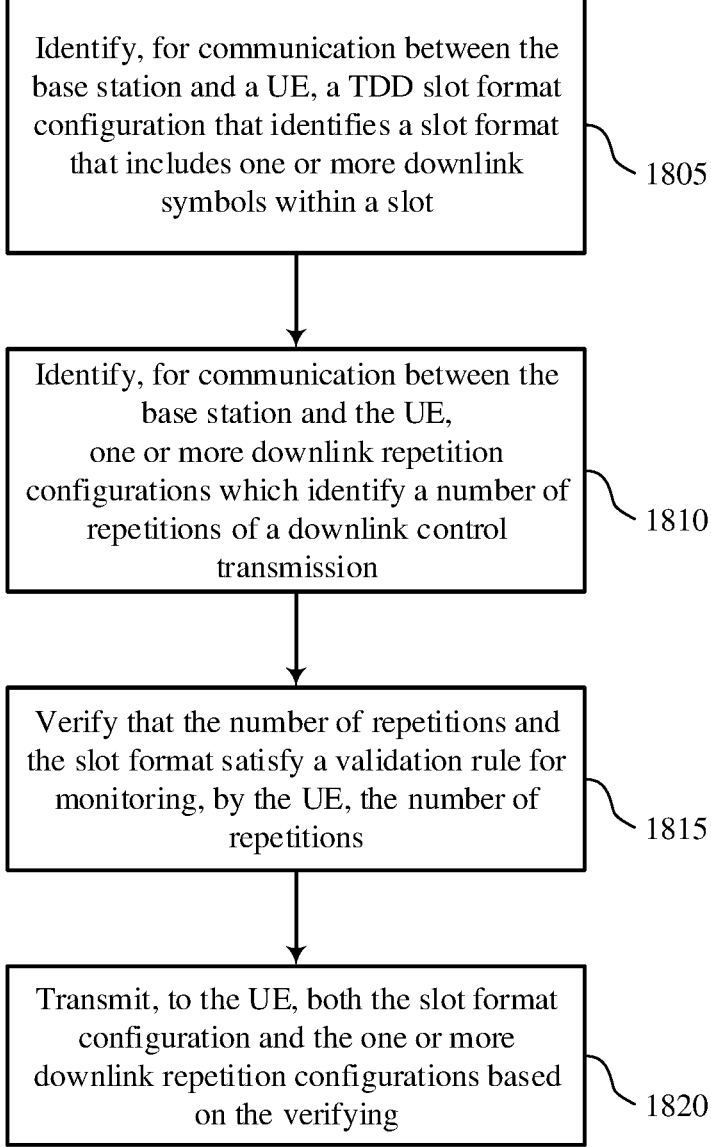

Identify, for communication between the base station and a UE, a TDD slot format configuration that identifies a slot format that includes one or more downlink symbols within a slot

1805

Identify, for communication between the base station and the UE, one or more downlink repetition configurations which identify a number of repetitions of a downlink control transmission

1810

Verify that the number of repetitions and the slot format satisfy a validation rule for monitoring, by the UE, the number of repetitions

1815

Transmit, to the UE, both the slot format configuration and the one or more downlink repetition configurations based on the verifying

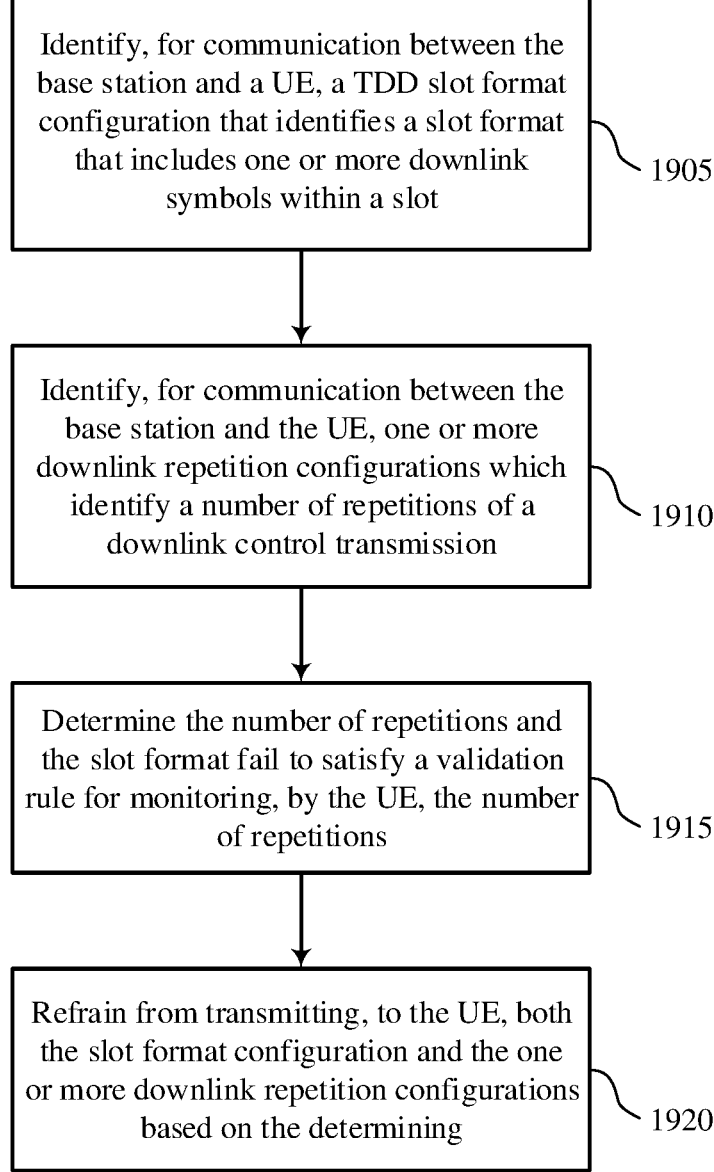

Identify, for communication between the base station and a UE, a TDD slot format configuration that identifies a slot format that includes one or more downlink symbols within a slot

1905

Identify, for communication between the base station and the UE, one or more downlink repetition configurations which identify a number of repetitions of a downlink control transmission

1910

Determine the number of repetitions and the slot format fail to satisfy a validation rule for monitoring, by the UE, the number of repetitions

1915

Refrain from transmitting, to the UE, both the slot format configuration and the one or more downlink repetition configurations based on the determining

MONITORING FOR DOWNLINK REPETITIONS

CROSS REFERENCE

The present Application is a 371 national stage filing of International PCT Application No. PCT/CN2020/090337 by LI et al. entitled "MONITORING FOR DOWNLINK REPETITIONS," filed May 14, 2020, which is assigned to the assignee hereof, and which is expressly incorporated by reference in its entirety herein.

FIELD OF TECHNOLOGY

The following relates generally to wireless communications and to monitoring for downlink repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support monitoring for downlink repetitions. Generally, the described techniques provide for a base station to identify a slot format configuration, such as a time division duplex (TDD) slot format configuration, and one or more downlink repetition configurations corresponding to a number of downlink repetitions for a user equipment (UE). The base station may transmit the configurations to the UE. The UE may determine that the configured slot format and the number of downlink repetitions satisfy, or fail to satisfy, a validation rule for monitoring the number of downlink repetitions. The UE may monitor, or refrain from monitoring, the number of repetitions based on whether the validation rule is satisfied.

A method of wireless communication at a UE is described. The method may include receiving, at the UE, a TDD slot format configuration that identifies a slot format that includes one or more downlink symbols within a slot, receiving, at the UE, one or more downlink repetition configurations which identify a number of repetitions of a downlink control transmission to be monitored by the UE within the slot, verifying that the number of repetitions to be monitored and the slot format satisfy a validation rule for monitoring the number of repetitions, and monitoring the number of repetitions in accordance with the validation rule.

An apparatus for wireless communication at a UE is described. The apparatus may include a processor, memory coupled with the processor, and instructions stored in the memory. The instructions may be executable by the processor to cause the apparatus to receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, verify that the number of repetitions to be monitored and the slot format satisfy a validation rule for monitoring the number of repetitions, and monitor the number of repetitions in accordance with the validation rule.

Another apparatus for wireless communication at a UE is described. The apparatus may include means for receiving, at the UE, a TDD slot format configuration that identifies a slot format that includes one or more downlink symbols within a slot, receiving, at the UE, one or more downlink repetition configurations which identify a number of repetitions of a downlink control transmission to be monitored by the UE within the slot, verifying that the number of repetitions to be monitored and the slot format satisfy a validation rule for monitoring the number of repetitions, and monitoring the number of repetitions in accordance with the validation rule.

A non-transitory computer-readable medium storing code for wireless communication at a UE is described. The code may include instructions executable by a processor to receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, verify that the number of repetitions to be monitored and the slot format satisfy a validation rule for monitoring the number of repetitions, and monitor the number of repetitions in accordance with the validation rule.

In some examples of the method, apparatuses, and non-transitory computer-readable medium described herein, verifying that the number of repetitions to be monitored and the slot format satisfy the validation rule may include operations, features, means, or instructions for determining that the validation rule may be satisfied based on the slot format having a number of downlink-compatible symbols sufficient to support a maximum number of repetitions, where the maximum number of repetitions may be identified by the UE.

Some examples of the method, apparatuses, and non-transitory computer-readable medium described herein may further include operations, features, means, or instructions for transmitting, in advance of receipt of the one or more downlink repetition configurations, an indication of the maximum number of repetitions as a UE capability.

In some examples of the method, apparatuses, and non-transitory computer-readable medium described herein, determining that the validation rule may be satisfied further may include operations, features, means, or instructions for determining the number of downlink-compatible symbols in the slot format based on the one or more downlink symbols and any flexible symbols of the slot format.

In some examples of the method, apparatuses, and non-transitory computer-readable medium described herein, determining that the validation rule may be satisfied further may include operations, features, means, or instructions for determining that the number of downlink-compatible symbols in the slot format may be equal to or greater than the maximum number of repetitions multiplied by a number of symbols in a multi-symbol control resource set (CORESET) of each of the one or more downlink repetition configurations.

In some examples of the method, apparatuses, and non-transitory computer-readable medium described herein, determining that the validation rule may be satisfied further may include operations, features, means, or instructions for determining the number of downlink-compatible symbols in the slot format based on a number of consecutive downlink symbols and flexible symbols of the slot format.

In some examples of the method, apparatuses, and non-transitory computer-readable medium described herein, the UE may be configured to use time division demodulation reference signal (DMRS) bundling.

In some examples of the method, apparatuses, and non-transitory computer-readable medium described herein, verifying that the number of repetitions to be monitored and the slot format satisfy the validation rule may include operations, features, means, or instructions for determining that the validation rule may be satisfied based on the slot format having a number of downlink-compatible symbols sufficient to support the number of repetitions identified by the one or more downlink repetition configurations.

In some examples of the method, apparatuses, and non-transitory computer-readable medium described herein, determining that the validation rule may be satisfied further may include operations, features, means, or instructions for determining the number of downlink-compatible symbols in the slot format based on the one or more downlink symbols and any flexible symbols of the slot format.

In some examples of the method, apparatuses, and non-transitory computer-readable medium described herein, determining that the validation rule may be satisfied further may include operations, features, means, or instructions for determining that the number of downlink-compatible symbols in the slot format may be equal to or greater than a maximum number of repetitions multiplied by a number of symbols in a multi-symbol CORESET of each of the one or more downlink repetition configurations.

In some examples of the method, apparatuses, and non-transitory computer-readable medium described herein, determining that the validation rule may be satisfied further may include operations, features, means, or instructions for determining the number of downlink-compatible symbols in the slot format based on a number of consecutive downlink symbols and flexible symbols of the slot format.

In some examples of the method, apparatuses, and non-transitory computer-readable medium described herein, the UE may be configured to use time division DMRS bundling.

In some examples of the method, apparatuses, and non-transitory computer-readable medium described herein, verifying that the number of repetitions to be monitored and the slot format satisfy the validation rule may include operations, features, means, or instructions for verifying that the slot format configuration may be received via one of radio resource control (RRC) signaling or a media access control-control element (MAC-CE).

In some examples of the method, apparatuses, and non-transitory computer-readable medium described herein, verifying that the number of repetitions to be monitored and the slot format satisfy the validation rule may include operations, features, means, or instructions for verifying that the slot format configuration may be dynamically received as a replacement of a previously received slot format configuration and may have fewer downlink-compatible symbols than in the previously received slot format configuration.

In some examples of the method, apparatuses, and non-transitory computer-readable medium described herein, the one or more downlink repetition configurations include search space configurations, CORESET configurations, physical downlink control channel (PDCCH) repetition configurations, or a combination thereof.

In some examples of the method, apparatuses, and non-transitory computer-readable medium described herein, the number of repetitions may be PDCCH repetitions.

A method of wireless communication at a UE is described. The method may include receiving, at the UE, a TDD slot format configuration that identifies a slot format that includes one or more downlink symbols within a slot, receiving, at the UE, one or more downlink repetition configurations which identify a number of repetitions of a downlink control transmission to be monitored by the UE within the slot, determining the number of repetitions to be monitored and the slot format fail to satisfy a validation rule for monitoring the number of repetitions, and refraining from monitoring the number of repetitions based on the determining.

An apparatus for wireless communication at a UE is described. The apparatus may include a processor, memory coupled with the processor, and instructions stored in the memory. The instructions may be executable by the processor to cause the apparatus to receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, determine the number of repetitions to be monitored and the slot format fail to satisfy a validation rule for monitoring the number of repetitions, and refrain from monitoring the number of repetitions based on the determining.

Another apparatus for wireless communication at a UE is described. The apparatus may include means for receiving, at the UE, a TDD slot format configuration that identifies a slot format that includes one or more downlink symbols within a slot, receiving, at the UE, one or more downlink repetition configurations which identify a number of repetitions of a downlink control transmission to be monitored by the UE within the slot, determining the number of repetitions to be monitored and the slot format fail to satisfy a validation rule for monitoring the number of repetitions, and refraining from monitoring the number of repetitions based on the determining.

A non-transitory computer-readable medium storing code for wireless communication at a UE is described. The code may include instructions executable by a processor to receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, determine the number of repetitions to be monitored and the slot format fail to satisfy a validation rule for monitoring the number of repetitions, and refrain from monitoring the number of repetitions based on the determining.

In some examples of the method, apparatuses, and non-transitory computer-readable medium described herein, determining the number of repetitions to be monitored and the slot format fail to satisfy the validation rule may include operations, features, means, or instructions for determining the number of downlink-compatible symbols in the slot format may be insufficient to support a maximum number of repetitions, where the maximum number of repetitions may be identified by the UE.

In some examples of the method, apparatuses, and non-transitory computer-readable medium described herein, determining the number of repetitions to be monitored and the slot format fail to satisfy the validation rule may include operations, features, means, or instructions for determining the number of downlink-compatible symbols in the slot format may be insufficient to support the number of repetitions identified by the one or more downlink repetition configurations.

In some examples of the method, apparatuses, and non-transitory computer-readable medium described herein, determining the number of repetitions to be monitored and the slot format fail to satisfy the validation rule may include operations, features, means, or instructions for determining the slot format configuration may be received via downlink control information (DCI).

A method of wireless communication at a base station is described. The method may include identifying, for communication between the base station and a UE, a TDD slot format configuration that identifies a slot format that includes one or more downlink symbols within a slot, identifying, for communication between the base station and the UE, one or more downlink repetition configurations which identify a number of repetitions of a downlink control transmission, verifying that the number of repetitions and the slot format satisfy a validation rule for monitoring, by the UE, the number of repetitions, and transmitting, to the UE, both the slot format configuration and the one or more downlink repetition configurations based on the verifying.

An apparatus for wireless communication at a base station is described. The apparatus may include a processor, memory coupled with the processor, and instructions stored in the memory. The instructions may be executable by the processor to cause the apparatus to identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, verify that the number of repetitions and the slot format satisfy a validation rule for monitoring, by the UE, the number of repetitions, and transmit, to the UE, both the slot format configuration and the one or more downlink repetition configurations based on the verifying.

Another apparatus for wireless communication at a base station is described. The apparatus may include means for identifying, for communication between the base station and a UE, a TDD slot format configuration that identifies a slot format that includes one or more downlink symbols within a slot, identifying, for communication between the base station and the UE, one or more downlink repetition configurations which identify a number of repetitions of a downlink control transmission, verifying that the number of repetitions and the slot format satisfy a validation rule for monitoring, by the UE, the number of repetitions, and transmitting, to the UE, both the slot format configuration and the one or more downlink repetition configurations based on the verifying.

A non-transitory computer-readable medium storing code for wireless communication at a base station is described. The code may include instructions executable by a processor to identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, verify that the number of repetitions and the slot format satisfy a validation rule for monitoring, by the UE, the number of repetitions, and transmit, to the UE, both the slot format configuration and the one or more downlink repetition configurations based on the verifying.

In some examples of the method, apparatuses, and non-transitory computer-readable medium described herein, verifying that the number of repetitions to be monitored and the slot format satisfy the validation rule may include operations, features, means, or instructions for determining that the validation rule may be satisfied based on the slot format having a number of downlink-compatible symbols sufficient to support a maximum number of repetitions, where the maximum number of repetitions may be identified by the UE.

Some examples of the method, apparatuses, and non-transitory computer-readable medium described herein may further include operations, features, means, or instructions for receiving, in advance of transmitting the one or more downlink repetition configurations, an indication of the maximum number of repetitions as a UE capability.

In some examples of the method, apparatuses, and non-transitory computer-readable medium described herein, determining that the validation rule may be satisfied further may include operations, features, means, or instructions for determining the number of downlink-compatible symbols in the slot format based on the one or more downlink symbols and any flexible symbols of the slot format.

In some examples of the method, apparatuses, and non-transitory computer-readable medium described herein, determining that the validation rule may be satisfied further may include operations, features, means, or instructions for determining that the number of downlink-compatible symbols in the slot format may be equal to or greater than the maximum number of repetitions multiplied by a number of symbols in a multi-symbol CORESET of each of the one or more downlink repetition configurations.

In some examples of the method, apparatuses, and non-transitory computer-readable medium described herein, determining that the validation rule may be satisfied further may include operations, features, means, or instructions for determining the number of downlink-compatible symbols in the slot format based on a number of consecutive downlink symbols and flexible symbols of the slot format.

Some examples of the method, apparatuses, and non-transitory computer-readable medium described herein may further include operations, features, means, or instructions for configuring the UE to use time division DMRS bundling.

In some examples of the method, apparatuses, and non-transitory computer-readable medium described herein, verifying that the number of repetitions to be monitored and the slot format satisfy the validation rule may include operations, features, means, or instructions for determining that the validation rule may be satisfied based on the slot format having a number of downlink-compatible symbols sufficient to support the number of repetitions identified by the one or more downlink repetition configurations.

In some examples of the method, apparatuses, and non-transitory computer-readable medium described herein, determining that the validation rule may be satisfied further may include operations, features, means, or instructions for determining the number of downlink-compatible symbols in the slot format based on the one or more downlink symbols and any flexible symbols of the slot format.

In some examples of the method, apparatuses, and non-transitory computer-readable medium described herein, determining that the validation rule may be satisfied further may include operations, features, means, or instructions for determining that the number of downlink-compatible symbols in the slot format may be equal to or greater than a maximum number of repetitions multiplied by a number of symbols in a multi-symbol CORESET of each of the one or more downlink repetition configurations.

In some examples of the method, apparatuses, and non-transitory computer-readable medium described herein, determining that the validation rule may be satisfied further may include operations, features, means, or instructions for determining the number of downlink-compatible symbols in the slot format based on a number of consecutive downlink symbols and flexible symbols of the slot format.

Some examples of the method, apparatuses, and non-transitory computer-readable medium described herein may further include operations, features, means, or instructions for configuring the UE to use time division DMRS bundling.

In some examples of the method, apparatuses, and non-transitory computer-readable medium described herein, the transmitting further may include operations, features, means, or instructions for transmitting the slot format configuration via one of RRC signaling or a MAC-CE.

In some examples of the method, apparatuses, and non-transitory computer-readable medium described herein, the transmitting further may include operations, features, means, or instructions for transmitting the slot format configuration dynamically as a replacement of a previously received slot format configuration, where the slot format configuration may have fewer downlink-compatible symbols than in the previously received slot format configuration.

In some examples of the method, apparatuses, and non-transitory computer-readable medium described herein, the one or more downlink repetition configurations include search space configurations, CORESET configurations, PDCCH repetition configurations, or a combination thereof.

In some examples of the method, apparatuses, and non-transitory computer-readable medium described herein, the number of repetitions may be PDCCH repetitions.

A method of wireless communication at a base station is described. The method may include identifying, for communication between the base station and a UE, a TDD slot format configuration that identifies a slot format that includes one or more downlink symbols within a slot, identifying, for communication between the base station and the UE, one or more downlink repetition configurations which identify a number of repetitions of a downlink control transmission, determining the number of repetitions and the slot format fail to satisfy a validation rule for monitoring, by the UE, the number of repetitions, and refraining from transmitting, to the UE, both the slot format configuration and the one or more downlink repetition configurations based on the determining.

An apparatus for wireless communication at a base station is described. The apparatus may include a processor, memory coupled with the processor, and instructions stored in the memory. The instructions may be executable by the processor to cause the apparatus to identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, determine the number of repetitions and the slot format fail to satisfy a validation rule for monitoring, by the UE, the number of repetitions, and refrain from transmitting, to the UE, both the slot format configuration and the one or more downlink repetition configurations based on the determining.

Another apparatus for wireless communication at a base station is described. The apparatus may include means for identifying, for communication between the base station and a UE, a TDD slot format configuration that identifies a slot format that includes one or more downlink symbols within a slot, identifying, for communication between the base station and the UE, one or more downlink repetition configurations which identify a number of repetitions of a downlink control transmission, determining the number of repetitions and the slot format fail to satisfy a validation rule for monitoring, by the UE, the number of repetitions, and refraining from transmitting, to the UE, both the slot format configuration and the one or more downlink repetition configurations based on the determining.

A non-transitory computer-readable medium storing code for wireless communication at a base station is described. The code may include instructions executable by a processor to identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, determine the number of repetitions and the slot format fail to satisfy a validation rule for monitoring, by the UE, the number of repetitions, and refrain from transmitting, to the UE, both the slot format configuration and the one or more downlink repetition configurations based on the determining.

In some examples of the method, apparatuses, and non-transitory computer-readable medium described herein, determining the number of repetitions and the slot format fail to satisfy the validation rule may include operations, features, means, or instructions for determining the number of downlink-compatible symbols in the slot format may be insufficient to support a maximum number of repetitions, where the maximum number of repetitions may be identified by the UE.

In some examples of the method, apparatuses, and non-transitory computer-readable medium described herein, determining the number of repetitions and the slot format fail to satisfy the validation rule may include operations, features, means, or instructions for determining the number of downlink-compatible symbols in the slot format may be insufficient to support the number of repetitions identified by the one or more downlink repetition configurations.

In some examples of the method, apparatuses, and non-transitory computer-readable medium described herein, the slot format configuration may be a second slot format configuration and determining the number of repetitions and the slot format fail to satisfy the validation rule may include operations, features, means, or instructions for transmitting, to the UE, a DCI message including a first slot format configuration.

BRIEF DESCRIPTION OF THE DRAWINGS

FIGS. 10 and 11 show block diagrams of devices that support monitoring for downlink repetitions in accordance with aspects of the present disclosure.

FIGS. 14 through 19 show flowcharts illustrating methods that support monitoring for downlink repetitions in accordance with aspects of the present disclosure.

DETAILED DESCRIPTION

Figure 1:
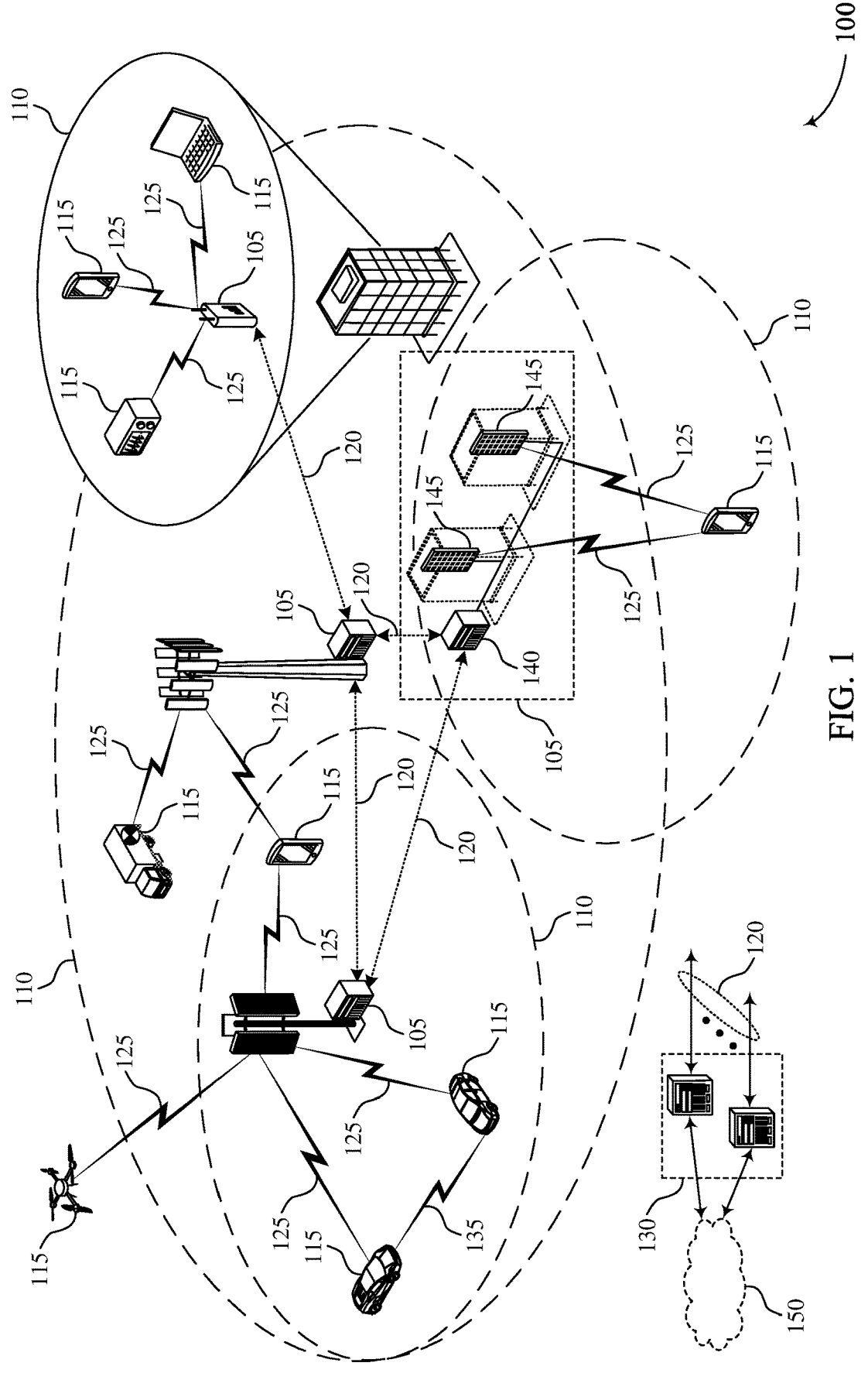
FIGS. 1 and 2 illustrate examples of wireless communications systems that supports monitoring for downlink repetitions in accordance with aspects of the present disclosure.

In some examples, a user equipment (UE) may be an example of a new radio (NR)-light UE, which may have reduced capabilities when compared with other UEs. For example, the UE may be a smart wearable device, an industrial sensor, a video surveillance device, or the like. In some cases, the UE may have a reduced number of receive antennas, transmit antennas, or both when compared with other UEs. Thus, a base station may transmit downlink repetitions to compensate for the coverage loss (e.g., due to a reduced number of receive antennas, bandwidth, or both at the UE).

Some wireless communications systems may include time division duplex (TDD) systems in which a slot (or other transmission time interval) may be divided into symbols designated for uplink communications and downlink communications. Therefore, and for example, a TDD slot format may be configured with a certain number of downlink symbols or flexible symbols that may be used for downlink communications. In an ideal scenario, the number of downlink-compatible symbols in the slot format is sufficient for the number of scheduled downlink repetitions. However, a slot format may or may not include a sufficient number of symbols for intra-slot downlink repetitions (e.g., downlink repetitions).

As described herein, a base station may configure a UE with a slot format configuration and a downlink repetition configuration for monitoring downlink repetitions. In some cases, the base station may transmit a number of downlink repetitions to the UE in a slot (e.g., because the UE may be an NR-light UE with a reduced number of receive antennas). The UE may monitor for downlink repetitions if the number of downlink repetitions in the slot and the slot format satisfy a validation rule. In some cases, the validation rule may correspond to a limit of downlink repetitions during the slot (e.g., a maximum number of downlink repetitions supportable by the UE). Additionally or alternatively, the UE may monitor a slot if it has a sufficient number of downlink-compatible symbols (e.g., downlink symbols, flexible symbols, or both). In some examples, the validation rule may correspond to the number of consecutive downlink-compatible symbols in the slot.

In some other cases, the base station may transmit a number of downlink repetitions to the UE in the slot, however the UE may refrain from monitoring for the repetitions based on the slot format and number of repetitions failing to satisfy the validation rule. For example, the validation rule may restrict a UE from considering dynamically-received slot format configurations (slot format configurations received via downlink control information (DCI)) in evaluating whether the validation rule is satisfied. In another example, the validation rule may allow consideration of dynamically-received slot format configurations, but only if a newly received slot format configuration (the dynamically received configuration) has a fewer number of downlink-compatible symbols than the configuration being replaced.

Aspects of the disclosure are initially described in the context of wireless communications systems. Additional aspects are described with reference to slot diagrams and process flows. Aspects of the disclosure are further illustrated by and described with reference to apparatus diagrams, system diagrams, and flowcharts that relate to monitoring for downlink repetitions.

FIG. 1 illustrates an example of a wireless communications system 100 that supports monitoring for downlink repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be an example of an NR-light UE 115, which may have reduced capabilities when compared with other UEs 115. For example, the UE 115 may be a smart wearable device, an industrial sensor, a video surveillance device, or the like. In some cases, the UE

115 may have a reduced number of receive antennas, transmit antennas, or both when compared with other UEs 115. Thus, a base station 105 may transmit downlink repetitions to compensate for the coverage loss (e.g., due to a reduced number of receive antennas, bandwidth, or both at the UE 115).

Some wireless communications systems may include TDD systems in which a slot (or other transmission time interval) may be divided into symbols designated for uplink communications and downlink communications. Therefore, and for example, a TDD slot format may be configured with a certain number of downlink symbols or flexible symbols that may be used for downlink communications. In an ideal scenario, the number of downlink-compatible symbols in the slot format is sufficient for the number of scheduled downlink repetitions. However, a slot format may or may not include a sufficient number of symbols for intra-slot downlink repetitions (e.g., downlink repetitions).

As described herein, wireless communications system 100 may support the use of techniques that enable a base station 105 to configure a UE 115 with a slot format configuration and a downlink repetition configuration for monitoring downlink repetitions. In some cases, the base station 105 may transmit a number of downlink repetitions to the UE 115 in a slot (e.g., because the UE 115 may be an NR-light UE 115 with a reduced number of receive antennas). The UE 115 may monitor for downlink repetitions if the number of downlink repetitions in the slot and the slot format satisfy a validation rule. In some cases, the validation rule may correspond to a limit of downlink repetitions during the slot (e.g., a maximum number of downlink repetitions supportable by the UE 115). Additionally or alternatively, UE 115 may monitor a slot if it has a sufficient number of downlink-compatible symbols (e.g., downlink symbols, flexible symbols, or both). In some examples, the validation rule may correspond to the number of consecutive downlink-compatible symbols in the slot.

In some other cases, the base station 105 may transmit a number of downlink repetitions to the UE 115 in the slot, however the UE 115 may refrain from monitoring for the repetitions based on the slot format and number of repetitions failing to satisfy the validation rule. For example, the validation rule may restrict a UE 115 from considering dynamically-received slot format configurations (slot format configurations received via DCI) in evaluating whether the validation rule is satisfied. In another example, the validation rule may allow consideration of dynamically-received slot format configurations, but only if a newly received slot format configuration (the dynamically received configuration) has a fewer number of downlink-compatible symbols than the configuration being replaced.

Figure 2:
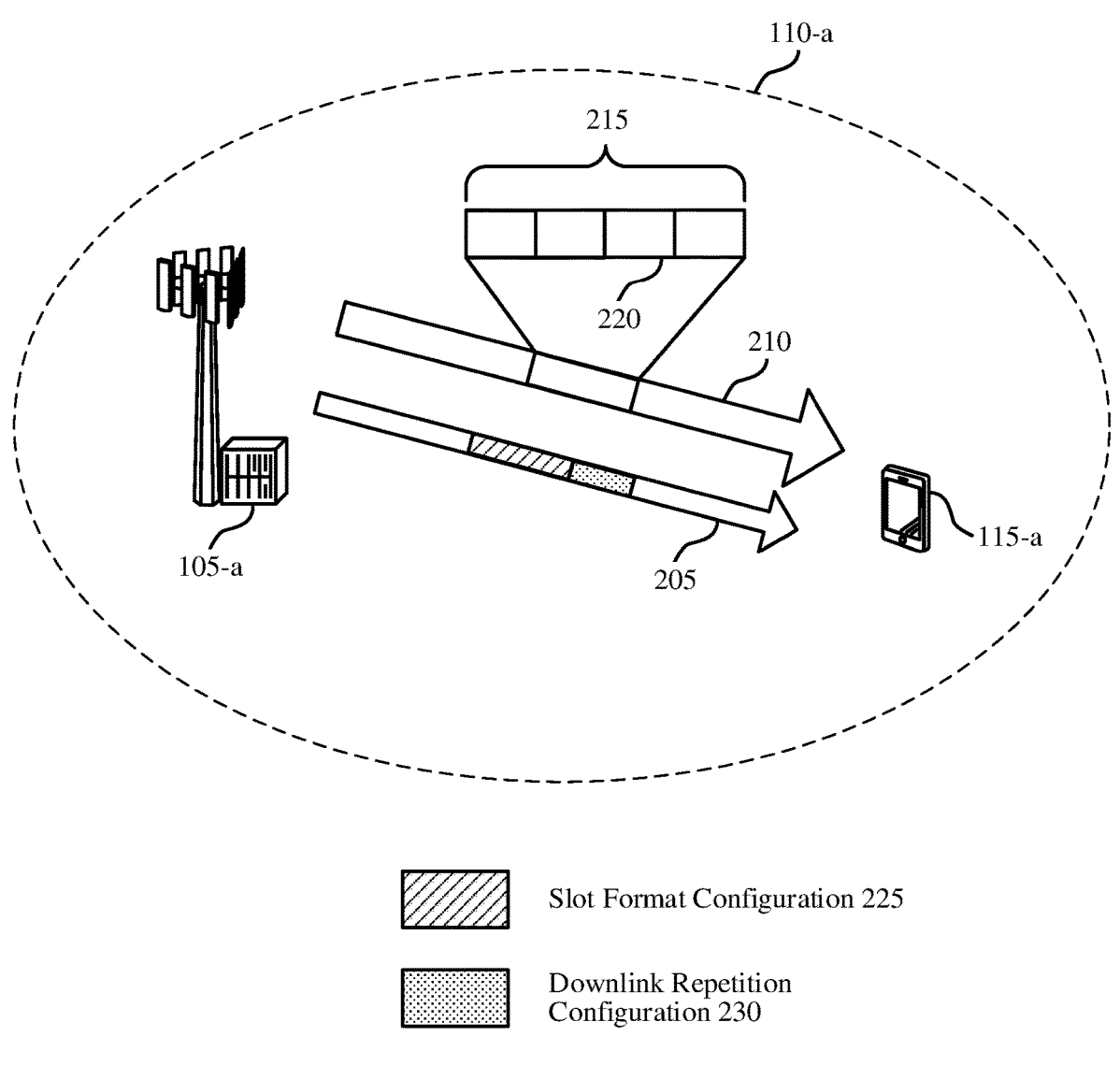

FIG. 2 illustrates an example of a wireless communications system 200 that supports monitoring for downlink repetitions in accordance with aspects of the present disclosure. In some examples, wireless communications system 200 may implement aspects of wireless communications system 100 and may include UE 115-*a* and base station 105-*a* with coverage area 110-*a,* which may be examples of UEs 115, a base station 105, and a coverage area 110 as described with reference to FIG. 1. As described herein, base station 105-*a* may configure UE 115-*a* with a TDD slot format configuration and a downlink repetition configuration to improve resource allocation and power consumption at the UE 115.

In some cases, UE 115-*a* may communicate with base station 105-*a*. For example, UE 115-*a* may receive control information via control link 205. Additionally or alternatively, UE 115-*a* may receive one or more downlink messages (e.g., including additional control information or data) via communication link 210 from base station 105-*a*. Although downlink transmissions are shown, UE 115-*a* may transmit one or more uplink messages (e.g., including control information and data) to base station 105-*a*. Each downlink message may be transmitted in a slot 215 with any number of symbols 220. In some cases, the slot may be referred to as a subframe, a TTI, or the like. In some cases, UE 115-*a* may receive a downlink message during one or more symbols of a considered CORESET.

In some examples, UE 115-*a* may be an example of an NR-light UE 115, which may have reduced capabilities when compared with other UEs 115. For example, UE 115-*a* may be a smart wearable device, an industrial sensor, a video surveillance device, or the like. In some cases, UE 115-*a* may have a reduced number of receive antennas, transmit antennas, or both when compared with other UEs 115. For example, UE 115-*a* may receive or transmit according to a 5 Megahertz (MHZ) to 20 MHz range compared with a premium UE 115, which may receive or transmit according to a 100 MHz bandwidth. Thus, a base station 105, such as base station 105-*a*, may transmit downlink repetitions to compensate for the coverage loss (e.g., due to a reduced number of receive antennas, bandwidth, or both at UE 115-*a*). In some cases, the downlink repetitions may be physical downlink control channel (PDCCH) repetitions or physical downlink shared channel (PDSCH) repetitions. In some examples, in a wireless communications system, such as a TDD system, a downlink slot may not include a sufficient number of symbols for intra-slot downlink repetitions (e.g., PDCCH repetitions). This problem may be exacerbated when the number of symbols of the considered CORESET is greater than two. Thus, improved techniques for downlink repetition monitoring at UE 115-*a* are desired.

As described herein, wireless communications system 200 may support the use of techniques that enable a base station 105 to configure a UE 115 with a slot format configuration 225 and a downlink repetition configuration 230 for monitoring downlink repetitions, which may improve complexity at the UE 115 as well as improve power consumption. For example, UE 115-*a* may receive a slot format configuration 225 and downlink repetition configuration 230 from base station 105-*a*. The downlink repetition configuration 230 may include a search space configuration, a CORESET configuration, a PDCCH repetition configuration, or a combination. Base station 105-*a* may allocate a number of symbols 220 to UE 115-*a* in a slot 215 based on the slot format configuration 225. The symbols 220 may be allocated for downlink transmissions from base station 105-*a*, uplink transmissions for base station 105-*a*, or may be flexible symbols which may be used for either uplink or downlink transmissions.

In some cases, base station 105-*a* may transmit a number of downlink repetitions to UE 115-*a* in the slot 215 (e.g., because UE 115-*a* may be an NR-light UE 115 with a reduced number of receive antennas). In some examples, the downlink repetitions may be PDCCH repetitions. UE 115-*a* may monitor for downlink repetitions if the number of downlink repetitions in the slot 215 and the slot format satisfy a validation rule. In some cases, the validation rule may involve a limit of downlink repetitions during the slot 215 (e.g., a maximum number of downlink repetitions that UE 115-*a* is capable of supporting). For example, the validation rule may specify that repetition monitoring may occur if the slot format corresponding to slot 215 has a number of downlink-compatible symbols sufficient to support a maximum number of repetitions allowed by UE 115-*a*, as described in detail with reference to FIG. 3.

Additionally or alternatively, the validation rule may indicate that UE 115-*a* may monitor a slot 215 if the slot 215 has a sufficient number of downlink-compatible symbols 220 for the scheduled repetitions. In some cases, downlink-compatible symbols 220 may include downlink symbols, flexible symbols, or both. In some examples, the slot 215 may be evaluated (for satisfaction of the validation rule) based on the number of consecutive downlink-compatible symbols 220 in the slot 215. For example, the validation rule may specify if the number of downlink-compatible symbols, or consecutive downlink-compatible symbols, a UE 115 receives in a slot format is equal to or greater than the symbols used for the number of downlink repetitions, the UE 115 may proceed with monitoring for the repetitions according to the slot format as described in detail with reference to FIG. 3. Base station 105-*a* may indicate the downlink repetition configuration 230 to UE 115-*a* via RRC signaling or a media access control-control element (MAC-CE).

In some other cases, only non-dynamically configured slot formats may be considered for evaluation of the validation rule. For example, if base station 105-*a* indicates the slot format configuration 225 to UE 115-*a* dynamically (e.g., via DCI), UE 115-*a* may refrain from considering the dynamically-indicated slot format in evaluating whether the validation rule is satisfied. Alternatively, UE 115-*a* may only consider DCI-received slot format configurations 225 when the configurations include fewer downlink-compatible symbols than the slot formats being replaced.

Figure 3A:
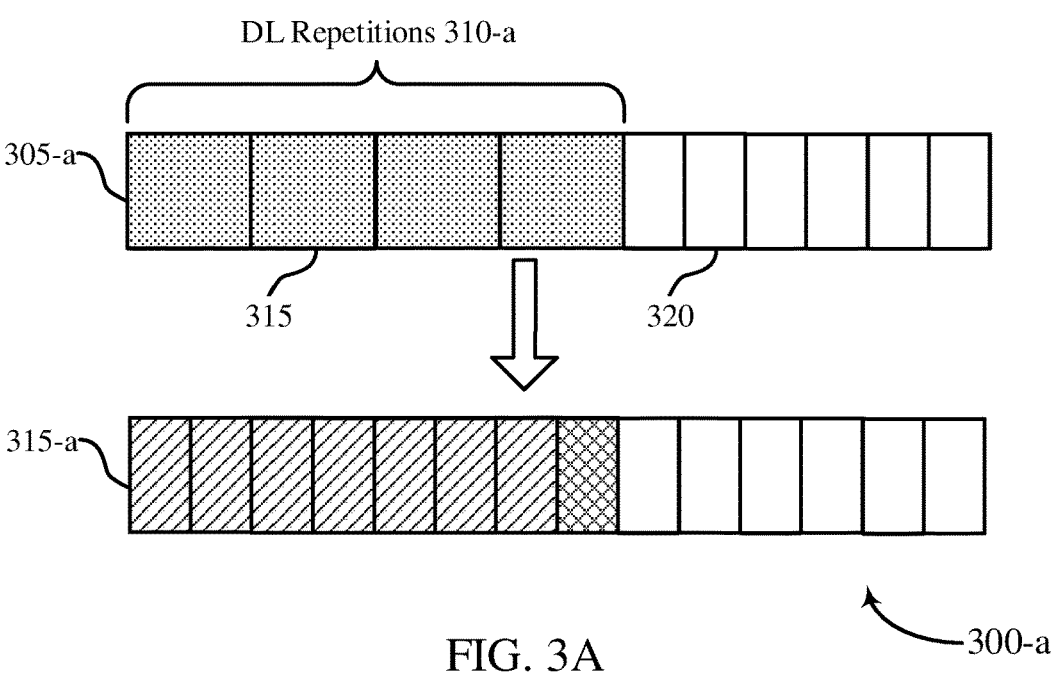
FIG. 3 illustrates an example of a slot diagram that supports monitoring for downlink repetitions in accordance with aspects of the present disclosure.
Figure 3B:
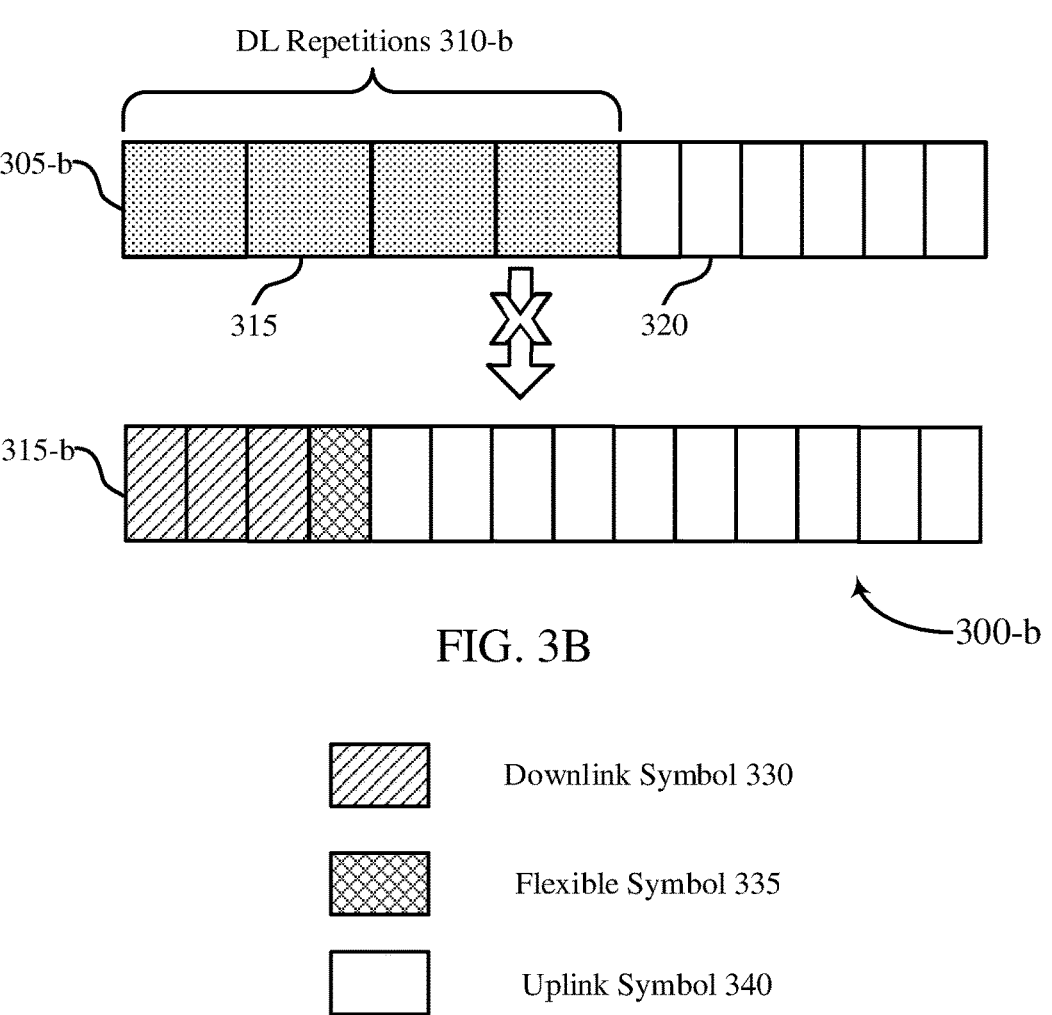

FIGS. 3A and 3B illustrate examples of a slot diagram 300 that supports monitoring for downlink repetitions in accordance with aspects of the present disclosure. In some examples, slot diagram 300 may implement aspects of wireless communications systems 100 and 200. As described herein, a base station 105 may configure a UE 115 with a downlink repetition configuration 305, which may correspond to a number of downlink repetitions 310 and a slot format configuration 315 as descried with reference to FIG. 2. The downlink repetition configuration 305 may correspond to a TDD wireless communications system.

In some cases, as illustrated in FIG. 3A, downlink repetition configuration 305-*a* may include a number of downlink repetitions 310-*a*. Although four downlink repetitions 310-*a* are shown, a transmission may include any number of downlink repetitions. A downlink repetition 315 may include one or multiple symbols 320. In the example of slot diagram 300-*a*, the downlink repetitions 315 are each two symbols 320. Slot format configuration 315-*a* may include one or more downlink symbols 330, one or more flexible symbols 335, one or more uplink symbols 340, or a combination thereof.

In some examples, the UE 115 may determine a maximum limit of downlink repetitions 310-*a* that the UE is capable of monitoring in a slot. For example, the UE 115 may determine a maximum number of repetitions, and the UE 115 may indicate this limit to the base station 105. The base station 105 may configure the UE 115 with a slot format configuration 315-*a* that may support the maximum number of repetitions. That is, the number of downlink-compatible symbols, such as downlink symbols 330 or flexible symbols 335, may be greater than or equal to the maximum number of repetitions multiplied by an integer factor for multi-symbol CORESETs. In some cases, the UE 115 may indicate the maximum number of repetitions to the base station 105 in a UE capability report, among other things. If the base station 105 configures the UE 115 with a number of repetitions of four as shown in slot diagram 300-*a*, and if the UE 115 is capable of monitoring four or fewer repetitions, the UE 115 may monitor the downlink repetitions according to slot format configuration 315-*a*.

However, as illustrated in FIG. 3B, if the UE 115 has a maximum number of repetitions 310-*b* that is greater than the maximum number of repetitions that the slot format configuration 315-*b* is capable of supporting, the UE 115 may refrain from monitoring the downlink repetitions according to slot format configuration 315-*b*.

Additionally or alternatively, as illustrated in FIG. 3A, the UE 115 may monitor downlink repetitions 310-*a* according to the number of downlink-compatible symbols in slot format configuration 315-*a*. For example, downlink repetition configuration 305-*a* may include four downlink repetitions 310-*a*. In some cases, each downlink repetition 315 may include two symbols. Thus, for four downlink repetitions 310-*a*, UE 115 may use eight downlink-compatible symbols (e.g., downlink symbols 330, flexible symbols 335, or both) for receiving the downlink repetitions 310-*a*. In some cases, UE 115 may monitor a slot with a number of downlink-compatible symbols greater than or equal to the number of symbols used for receiving downlink repetitions 310-*a*.

However, as illustrated in FIG. 3B, if the UE 115 is configured with a slot format configuration 315-*b* that includes insufficient downlink-compatible symbols to receive downlink repetitions 310-*b* indicated in downlink repetition configuration 305-*b*, the UE 115 may refrain from monitoring the downlink repetitions.

In some cases, the validation rule may require that the UE 115 only consider consecutive downlink-compatible symbols in the slot format configuration 315. For example, if the consecutive number of downlink-compatible symbols is greater than or equal to the number of downlink-compatible symbols used for receiving the maximum number of downlink repetitions 310 multiplied by the integer factor for multi-symbol CORESETs (e.g., a number of symbols in a multi-symbol CORESET of the downlink repetition configuration 315), the UE 115 may monitor for the downlink repetitions 310. However, if the consecutive number of downlink-compatible symbols is less than the number of downlink-compatible symbols used for receiving the maximum number of downlink repetitions 310 multiplied by the integer factor for multi-symbol CORESETs, the UE 115 may refrain from monitoring for the downlink repetitions 310. In some cases, the UE 115 may receive the downlink repetitions 310 according to consecutive downlink-compatible symbols based on being configured with a time division demodulation reference signal (DMRS) bundling for the downlink repetitions.

In some examples, the base station 105 may dynamically increase the number of downlink-compatible symbols for a slot (e.g., via DCI). The UE 115 may not account for this dynamically indicated slot format. For example, the UE 115 may miss the dynamically indicated slot format. Thus, the validation rule may require that the UE 115 may monitor downlink repetitions according to slot format configurations indicated via RRC signaling or a MAC-CE, but not slot format configurations received via DCI. Additionally or alternatively, the validation rule may allow the UE 115 to monitor downlink repetitions for slots when the slot format is dynamically received via DCI but includes a reduced number of downlink-compatible symbols with respect to a previous slot format (the slot format being replaced by the dynamically-received slot format).

Figure 4:
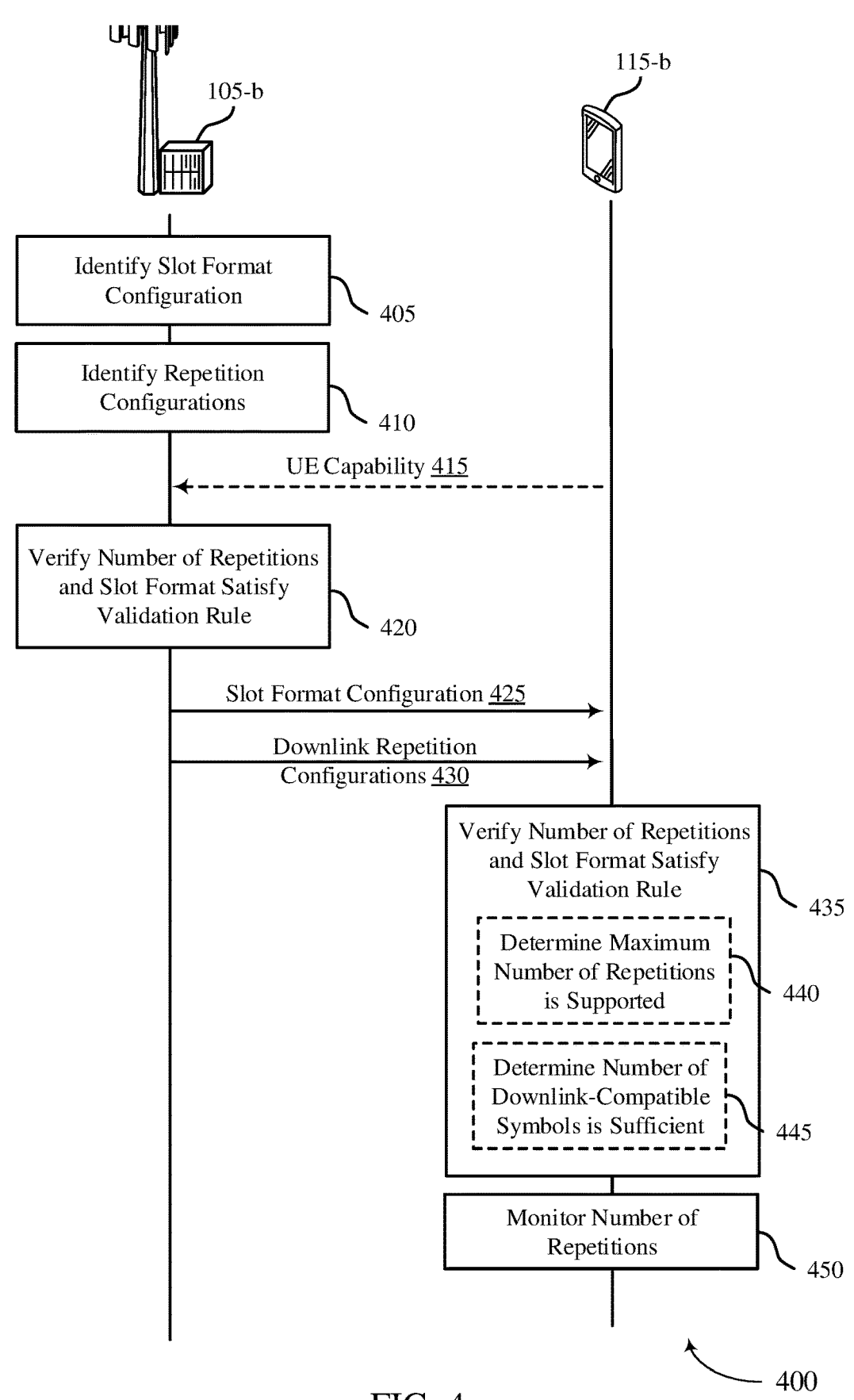
FIGS. 4 and 5 illustrate examples of process flows that support monitoring for downlink repetitions in accordance with aspects of the present disclosure.

FIG. 4 illustrates an example of a process flow 400 that supports monitoring for downlink repetitions in accordance with aspects of the present disclosure. In some examples, process flow 400 may implement aspects of wireless communications systems 100 and 200. The process flow 400 may illustrate an example of a base station 105, such as base station 105-*b*, configuring a UE 115, such as UE 115-*b*, for monitoring downlink repetitions. Alternative examples of the following may be implemented, where some processes are performed in a different order than described or are not performed at all. In some cases, processes may include additional features not mentioned below, or further processes may be added.

At 405, base station 105-*b* may identify a slot format configuration that identifies a slot format including one or more downlink symbols within a slot. In some cases, the slot format configuration may be a TDD slot format configuration and may be used for communications between base station 105-*b* and UE 115-*b*.

At 410, base station 105-*b* may identify one or more repetition configurations which may identify a number of repetitions of a downlink control transmission. At 415, base station 105-*b* may receive a UE capability from UE 115-*b*. In some cases, the capability may include an indication of the maximum number of repetitions that the UE 115-*b* is able to receive within a slot. In some examples, the repetitions may be PDCCH repetitions.

At 420, base station 105-*b* may verify the number of repetitions and the slot format satisfy a validation rule. In some cases, the validation rule may correspond to if UE 115-*b* monitors for the number of repetitions. In some examples, base station 105-*b* may determine the validation rule is satisfied based on the slot format having a number of downlink-compatible symbols (e.g., downlink symbols, flexible symbols, or both) sufficient to support a maximum number of repetitions. In some cases, the maximum number of repetitions may be identified by UE 115-*b*. In some cases, the validation rule may be satisfied for downlink-compatible symbols in the slot format based on a number of consecutive downlink-compatible symbols (e.g., downlink symbols, flexible symbols, or both). Base station 105-*b* may configure UE 115-*b* to use time division DMRS bundling.

In some cases, base station 105-*b* may determine the validation rule is satisfied based on the slot format having a number of downlink-compatible symbols sufficient to support the number of repetitions identified by the one or more downlink repetition configurations. In some cases, the validation rule may be satisfied for downlink-compatible symbols in the slot format based on a number of consecutive downlink-compatible symbols (e.g., downlink symbols, flexible symbols, or both). Base station 105-*b* may configure UE 115-*b* to use time division DMRS bundling.

Additionally or alternatively, base station 105-*b* may determine the validation rule is satisfied based on the number of downlink-compatible symbols in the slot format being equal to, or greater than, the maximum number of repetitions multiplied by a number of symbols in a multi-symbol CORESET of each of the one or more downlink repetition configurations.

At 425, base station 105-*b* may transmit the slot format configuration to UE 115-*b*. In some cases, base station 105-*b* may transmit the slot format configuration to UE 115-*b* via RRC signaling or a MAC-CE. In some examples, base station 105-*b* may transmit the slot format configuration dynamically as a replacement of a previously received slot format configuration. The slot format configuration may have fewer downlink-compatible symbols than the previous slot format configuration.

At 430, UE 115-*b* may receive one or more downlink repetition configurations from base station 105-*b*. In some cases, the one or more downlink repetition configurations may include search space configurations, CORESET configurations, PDCCH repetition configurations, or a combination thereof.

At 435, UE 115-*b* may verify the number of repetitions to be monitored and the slot format satisfy the validation rule for monitoring the number of repetitions. For example, at 440, UE 115-*b* may determine the validation rule is satisfied based on the slot format having a number of downlink-compatible symbols sufficient to support a maximum number of repetitions or at 445, the slot format having a number of downlink-compatible symbols sufficient to support the number of repetitions identified by the one or more downlink repetition configurations as described at 420.

At 450, UE 115-*b* may monitor a number of downlink repetitions based on verifying the number of repetitions to be monitored and the slot format satisfy the validation rule.

Figure 5:
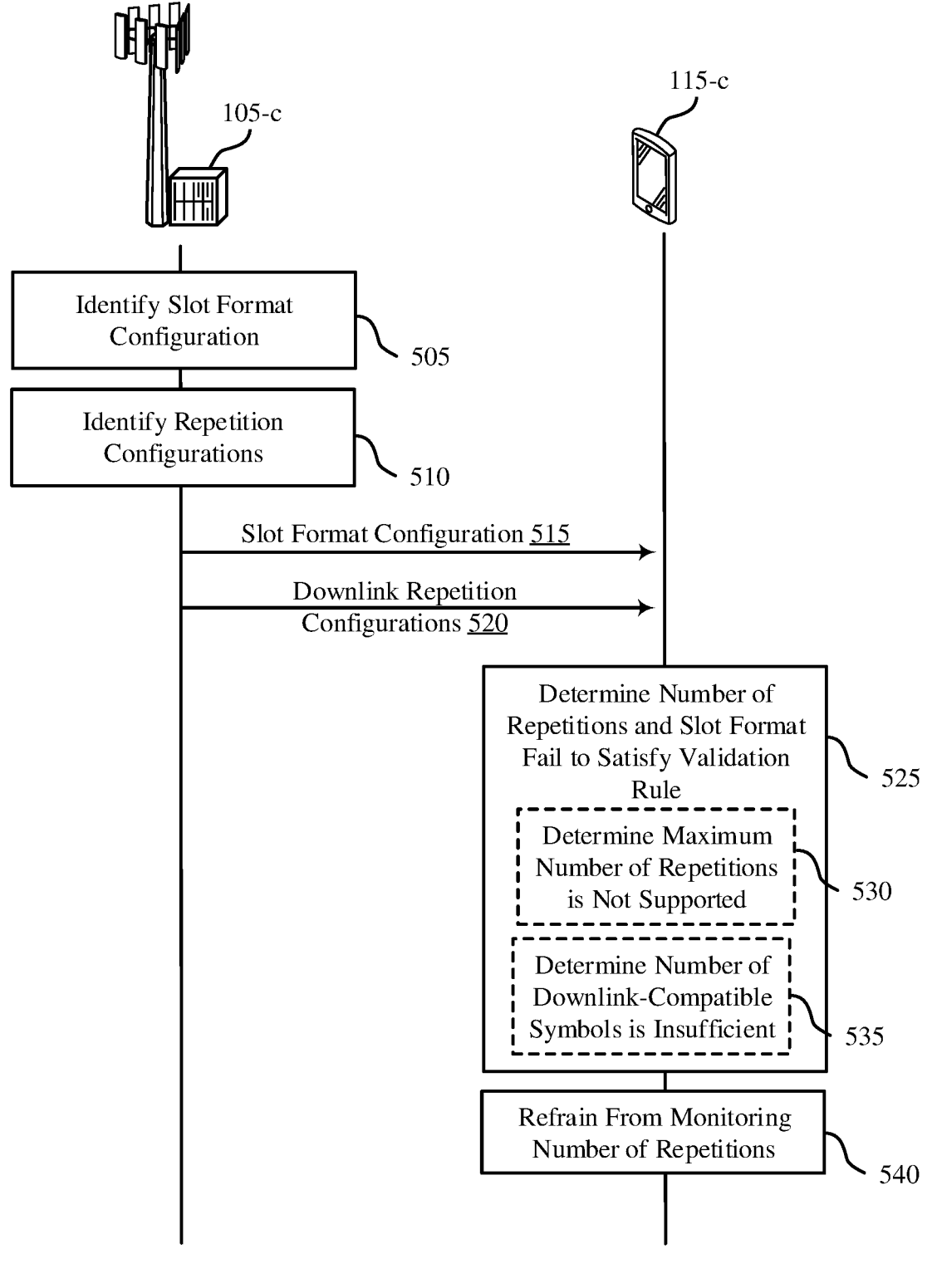

FIG. 5 illustrates an example of a process flow 500 that supports monitoring for downlink repetitions in accordance with aspects of the present disclosure. In some examples, process flow 500 may implement aspects of wireless communications systems 100 and 200 as well as process flow 400. The process flow 500 may illustrate an example of a base station 105 configuring a UE 115 for monitoring downlink repetitions. Alternative examples of the following may be implemented, where some processes are performed in a different order than described or are not performed at all. In some cases, processes may include additional features not mentioned below, or further processes may be added.

At 505, base station 105-*c* may identify a slot format configuration that identifies a slot format including one or more downlink symbols within a slot. In some cases, the slot format configuration may be a TDD slot format configuration and may be used for communications between base station 105-*c* and UE 115-*c*.

At 510, base station 105-*c* may identify one or more repetition configurations which may identify a number of repetitions of a downlink control transmission. In some examples, the repetitions may be PDCCH repetitions.

At 515, base station 105-*c* may transmit the slot format configuration to UE 115-*c*. In some cases, base station 105-*c* may transmit an additional slot format configuration to UE 115-*c*. UE 115-*c* may dynamically receive the additional slot format configuration as a replacement for a previously received slot format configuration and may have more downlink-compatible symbols than in the previously received slot format configuration.

At 520, UE 115-*c* may receive one or more downlink repetition configurations from base station 105-*c*. In some cases, the one or more downlink repetition configurations may include search space configurations, CORESET configurations, PDCCH repetition configurations, or a combination thereof.

At 535, UE 115-*c* may determine the number of repetitions to be monitored and the slot format fail to satisfy the validation rule for monitoring the number of repetitions. In some cases, the validation rule may correspond to if UE 115-*c* monitors for the number of repetitions. In some examples, the validation rule may not be satisfied based on the slot format having a number of downlink-compatible symbols (e.g., downlink symbols, flexible symbols, or both) insufficient to support a maximum number of repetitions. In some cases, the maximum number of repetitions may be identified by UE 115-*c*. In some cases, the validation rule may not be satisfied for downlink-compatible symbols in the slot format based on a number of consecutive downlink-compatible symbols (e.g., downlink symbols, flexible symbols, or both).

In some cases, the validation rule may not be satisfied based on the slot format having a number of downlink-compatible symbols insufficient to support the number of repetitions identified by the one or more downlink repetition configurations. In some cases, the validation rule may not be satisfied for downlink-compatible symbols in the slot format based on a number of consecutive downlink-compatible symbols (e.g., downlink symbols, flexible symbols, or both).

Additionally or alternatively, base station 105-*c* may determine the validation rule may not be satisfied based on the number of downlink-compatible symbols in the slot format being less than the maximum number of repetitions multiplied by a number of symbols in a multi-symbol CORESET of each of the one or more downlink repetition configurations. In some cases, base station 105-*c* may configure UE 115-*c* to use time division DMRS bundling.

At 550, UE 115-*c* may refrain from monitoring a number of downlink repetitions based on determining the number of repetitions to be monitored and the slot format fail to satisfy the validation rule.

Figure 6:
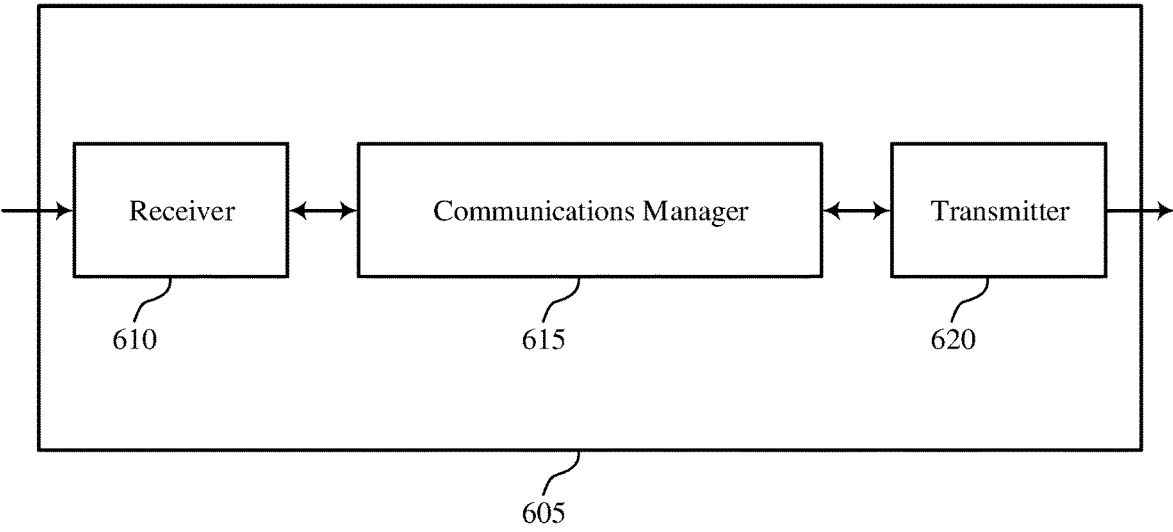
FIGS. 6 and 7 show block diagrams of devices that support monitoring for downlink repetitions in accordance with aspects of the present disclosure.

FIG. 6 shows a block diagram 600 of a device 605 that supports monitoring for downlink repetitions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to monitoring for downlink repetitions, etc.). Information may be passed on to other components of the device 605. The receiver 610 may be an example of aspects of the transceiver 920 described with reference to FIG. 9. The receiver 610 may utilize a single antenna or a set of antennas.

In some examples, the communications manager 615 may receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, verify that the number of repetitions to be monitored and the slot format satisfy a validation rule for monitoring the number of repetitions, and monitor the number of repetitions in accordance with the validation rule. In some other examples, the communications manager 615 may receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, determine the number of repetitions to be monitored and the slot format fail to satisfy a validation rule for monitoring the number of repetitions, and refrain from monitoring the number of repetitions based on the determining. The communications manager 615 may be an example of aspects of the communications manager 910 described herein.

The actions performed by the communications manager 615 as described herein may be implemented to realize one or more potential advantages. One implementation may enable a base station to transmit a slot format configuration and one or more downlink repetition configurations for monitoring downlink repetitions to a UE. Such configuration may enable a UE to determine whether to monitor the downlink repetitions, which may result in lower complexity at the UE, among other advantages.

Based on implementing the indications as described herein, a processor of a UE or base station (e.g., a processor controlling the receiver 610, the communications manager 615, the transmitter 620, or a combination thereof) may reduce the impact or likelihood of inefficient monitoring of downlink repetitions while ensuring relatively efficient communications. For example, the configuration techniques described herein may leverage a maximum number of downlink repetitions or a number of downlink-compatible symbols during a slot to ensure a validation rule is met for monitoring the downlink repetitions, which may realize power savings, among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
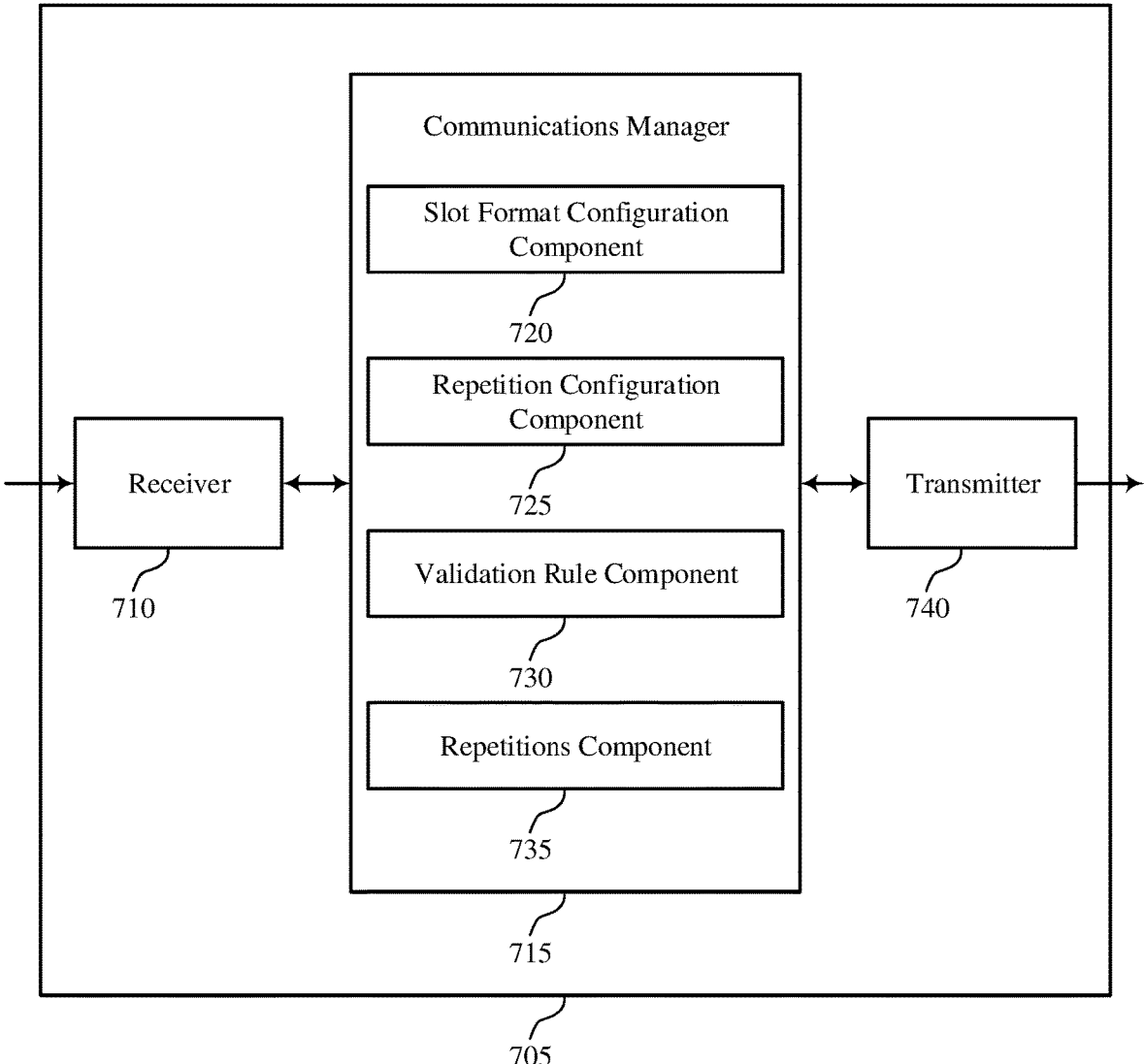

FIG. 7 shows a block diagram 700 of a device 705 that supports monitoring for downlink repetitions in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to monitoring for downlink repetitions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a slot format configuration component 720, a repetition configuration component 725, a validation rule component 730, and a repetitions component 735. The communications manager 715 may be an example of aspects of the communications manager 910 described herein.

The slot format configuration component 720 may receive, at the UE, a TDD slot format configuration that identifies a slot format that includes one or more downlink symbols within a slot. The repetition configuration component 725 may receive, at the UE, one or more downlink repetition configurations which identify a number of repetitions of a downlink control transmission to be monitored by the UE within the slot. The validation rule component 730 may verify that the number of repetitions to be monitored and the slot format satisfy a validation rule for monitoring the number of repetitions. The repetitions component 735 may monitor the number of repetitions in accordance with the validation rule.

The slot format configuration component 720 may receive, at the UE, a TDD slot format configuration that identifies a slot format that includes one or more downlink symbols within a slot. The repetition configuration component 725 may receive, at the UE, one or more downlink repetition configurations which identify a number of repetitions of a downlink control transmission to be monitored by the UE within the slot. The validation rule component 730 may determine the number of repetitions to be monitored and the slot format fail to satisfy a validation rule for monitoring the number of repetitions. The repetitions component 735 may refrain from monitoring the number of repetitions based on the determining.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
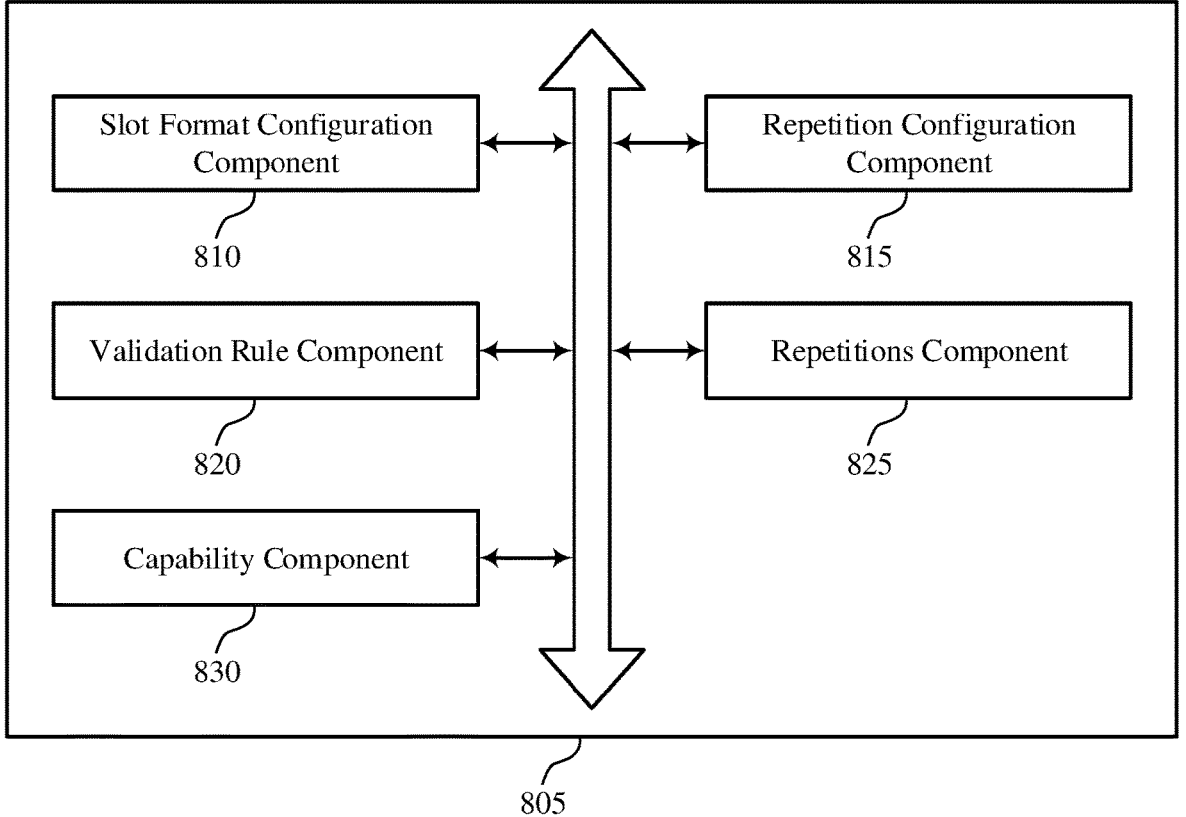
FIG. 8 shows a block diagram of a communications manager that supports monitoring for downlink repetitions in accordance with aspects of the present disclosure.

FIG. 8 shows a block diagram 800 of a communications manager 805 that supports monitoring for downlink repetitions in accordance with aspects of the present disclosure. The communications manager 805 may be an example of aspects of a communications manager 615, a communications manager 715, or a communications manager 910 described herein. The communications manager 805 may include a slot format configuration component 810, a repetition configuration component 815, a validation rule component 820, a repetitions component 825, and a capability component 830. Each of these modules may communicate, directly or indirectly, with one another (e.g., via one or more buses).

In some cases, the slot format configuration component 810 may receive, at the UE, a TDD slot format configuration that identifies a slot format that includes one or more downlink symbols within a slot. The slot format configuration component 810 may verify that the slot format configuration is received via one of RRC signaling or a MAC-CE. In some examples, the slot format configuration component 810 may verify that the slot format configuration is dynamically received as a replacement of a previously received slot format configuration and has fewer downlink-compatible symbols than in the previously received slot format configuration.

The repetition configuration component 815 may receive, at the UE, one or more downlink repetition configurations which identify a number of repetitions of a downlink control transmission to be monitored by the UE within the slot. The validation rule component 820 may verify that the number of repetitions to be monitored and the slot format satisfy a validation rule for monitoring the number of repetitions. In some cases, the one or more downlink repetition configurations include search space configurations, CORSET configurations, PDCCH repetition configurations, or a combination thereof. The capability component 830 may transmit, in advance of receipt of the one or more downlink repetition configurations, an indication of the maximum number of repetitions as a UE capability.

In some examples, the validation rule component 820 may determine that the validation rule is satisfied based on the slot format having a number of downlink-compatible symbols sufficient to support a maximum number of repetitions, where the maximum number of repetitions is identified by the UE. In some examples, the validation rule component 820 may determine the number of downlink-compatible symbols in the slot format based on the one or more downlink symbols and any flexible symbols of the slot format.

In some examples, the validation rule component 820 may determine that the number of downlink-compatible symbols in the slot format is equal to or greater than the maximum number of repetitions multiplied by a number of symbols in a multi-symbol CORESET of each of the one or more downlink repetition configurations. In some examples, the validation rule component 820 may determine the number of downlink-compatible symbols in the slot format based on a number of consecutive downlink symbols and flexible symbols of the slot format.

In some examples, the validation rule component 820 may determine that the validation rule is satisfied based on the slot format having a number of downlink-compatible symbols sufficient to support the number of repetitions identified by the one or more downlink repetition configurations. In some examples, the validation rule component 820 may determine that the number of downlink-compatible symbols in the slot format is equal to or greater than a maximum number of repetitions multiplied by a number of symbols in a multi-symbol CORESET of each of the one or more downlink repetition configurations. In some cases, the UE is configured to use time division DMRS bundling. The repetitions component 825 may monitor the number of repetitions in accordance with the validation rule. In some cases, the number of repetitions are PDCCH repetitions.

In some other examples, the slot format configuration component 810 may receive, at the UE, a TDD slot format configuration that identifies a slot format that includes one or more downlink symbols within a slot. In some examples, the slot format configuration component 810 may determine the slot format configuration is received via DCI. In some examples, the repetition configuration component 815 may receive, at the UE, one or more downlink repetition configurations which identify a number of repetitions of a downlink control transmission to be monitored by the UE within the slot. In some examples, the validation rule component 820 may determine the number of repetitions to be monitored and the slot format fail to satisfy a validation rule for monitoring the number of repetitions.

In some examples, the validation rule component 820 may determine the number of downlink-compatible symbols in the slot format is insufficient to support a maximum number of repetitions, where the maximum number of repetitions is identified by the UE. In some examples, the validation rule component 820 may determine the number of downlink-compatible symbols in the slot format is insufficient to support the number of repetitions identified by the one or more downlink repetition configurations. In some examples, the repetitions component 825 may refrain from monitoring the number of repetitions based on the determining.

Figure 9:
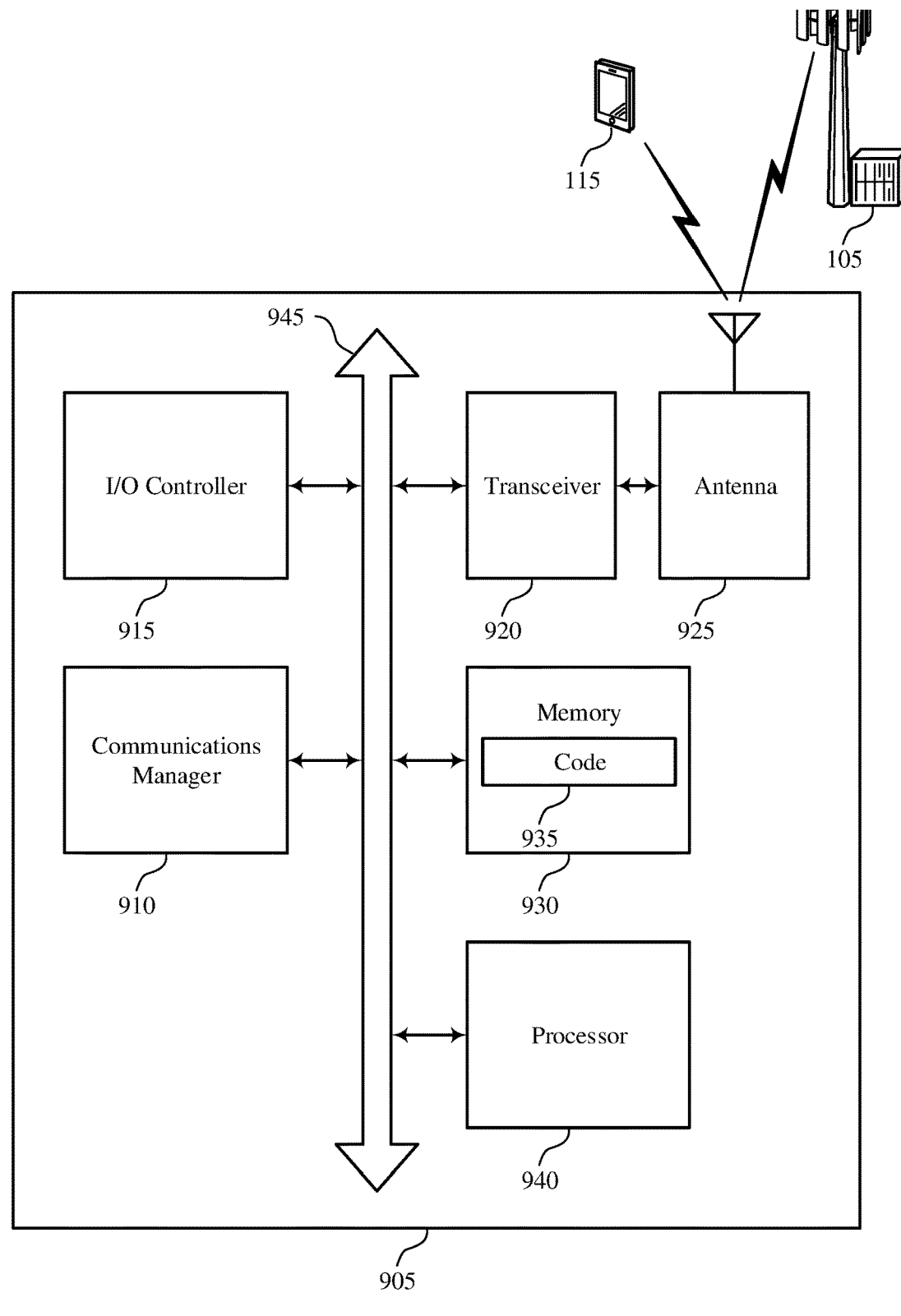
FIG. 9 shows a diagram of a system including a device that supports monitoring for downlink repetitions in accordance with aspects of the present disclosure.

FIG. 9 shows a diagram of a system 900 including a device 905 that supports monitoring for downlink repetitions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, verify that the number of repetitions to be monitored and the slot format satisfy a validation rule for monitoring the number of repetitions, and monitor the number of repetitions in accordance with the validation rule. Additionally or alternatively, the communications manager 910 may receive, at the UE, a TDD slot format configuration that identifies a slot format that includes one or more downlink symbols within a slot, receive, at the UE, one or more downlink repetition configurations which identify a number of repetitions of a downlink control transmission to be monitored by the UE within the slot, determine the number of repetitions to be monitored and the slot format fail to satisfy a validation rule for monitoring the number of repetitions, and refrain from monitoring the number of repetitions based on the determining.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bidirectionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting monitoring for downlink repetitions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a block diagram 1000 of a device 1005 that supports monitoring for downlink repetitions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to monitoring for downlink repetitions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, verify that the number of repetitions and the slot format satisfy a validation rule for monitoring, by the UE, the number of repetitions, and transmit, to the UE, both the slot format configuration and the one or more downlink repetition configurations based on the verifying.

The communications manager 1015 may identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, determine the number of repetitions and the slot format fail to satisfy a validation rule for monitoring, by the UE, the number of repetitions, and refrain from transmitting, to the UE, both the slot format configuration and the one or more downlink repetition configurations based on the determining. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:

FIG. 11 shows a block diagram 1100 of a device 1105 that supports monitoring for downlink repetitions in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to monitoring for downlink repetitions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a slot format configuration component 1120, a repetition configuration component 1125, a validation rule component 1130, and a repetitions component 1135. The communications manager 1115 may be an example of aspects of the communications manager 1310 described herein.

The slot format configuration component 1120 may identify, for communication between the base station and a UE, a TDD slot format configuration that identifies a slot format that includes one or more downlink symbols within a slot. The repetition configuration component 1125 may identify, for communication between the base station and the UE, one or more downlink repetition configurations which identify a number of repetitions of a downlink control transmission. The validation rule component 1130 may verify that the number of repetitions and the slot format satisfy a validation rule for monitoring, by the UE, the number of repetitions. The repetitions component 1135 may transmit, to the UE, both the slot format configuration and the one or more downlink repetition configurations based on the verifying.

The slot format configuration component 1120 may identify, for communication between the base station and a UE, a TDD slot format configuration that identifies a slot format that includes one or more downlink symbols within a slot. The repetition configuration component 1125 may identify, for communication between the base station and the UE, one or more downlink repetition configurations which identify a number of repetitions of a downlink control transmission. The validation rule component 1130 may determine the number of repetitions and the slot format fail to satisfy a validation rule for monitoring, by the UE, the number of repetitions. The repetitions component 1135 may refrain from transmitting, to the UE, both the slot format configuration and the one or more downlink repetition configurations based on the determining.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
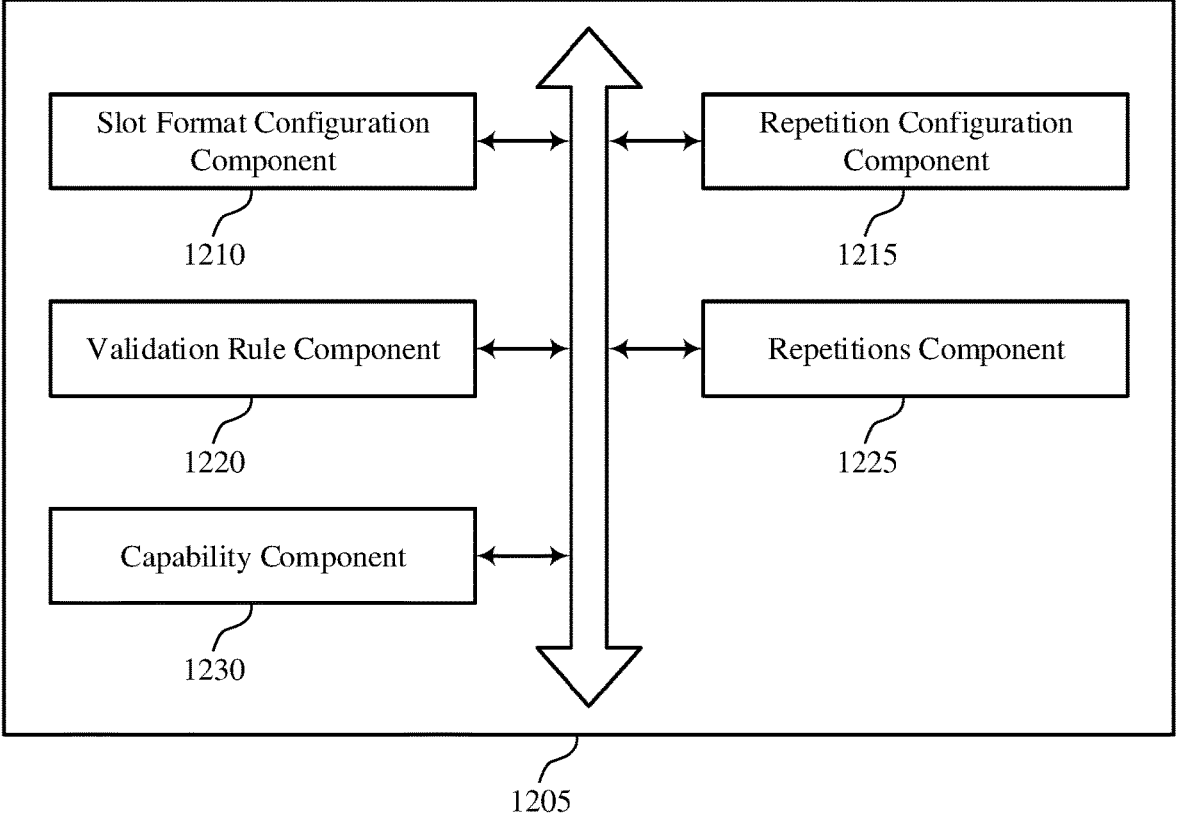
FIG. 12 shows a block diagram of a communications manager that supports monitoring for downlink repetitions in accordance with aspects of the present disclosure.

FIG. 12 shows a block diagram 1200 of a communications manager 1205 that supports monitoring for downlink repetitions in accordance with aspects of the present disclosure. The communications manager 1205 may be an example of aspects of a communications manager 1015, a communications manager 1115, or a communications manager 1310 described herein. The communications manager 1205 may include a slot format configuration component 1210, a repetition configuration component 1215, a validation rule component 1220, a repetitions component 1225, and a capability component 1230. Each of these modules may communicate, directly or indirectly, with one another (e.g., via one or more buses).

The slot format configuration component 1210 may identify, for communication between the base station and a UE, a TDD slot format configuration that identifies a slot format that includes one or more downlink symbols within a slot. In some examples, the slot format configuration component 1210 may transmit the slot format configuration via one of RRC signaling or a MAC-CE. In some examples, the slot format configuration component 1210 may transmit the slot format configuration dynamically as a replacement of a previously received slot format configuration, where the slot format configuration has fewer downlink-compatible symbols than in the previously received slot format configuration.

The repetition configuration component 1215 may identify, for communication between the base station and the UE, one or more downlink repetition configurations which identify a number of repetitions of a downlink control transmission. In some cases, the one or more downlink repetition configurations include search space configurations, CORESET configurations, PDCCH repetition configurations, or a combination thereof. In some cases, the number of repetitions are PDCCH repetitions. The capability component 1230 may receive, in advance of transmitting the one or more downlink repetition configurations, an indication of the maximum number of repetitions as a UE capability.

The validation rule component 1220 may verify that the number of repetitions and the slot format satisfy a validation rule for monitoring, by the UE, the number of repetitions. In some examples, the validation rule component 1220 may determine that the validation rule is satisfied based on the slot format having a number of downlink-compatible symbols sufficient to support a maximum number of repetitions, where the maximum number of repetitions is identified by the UE. In some examples, the validation rule component 1220 may determine the number of downlink-compatible symbols in the slot format based on the one or more downlink symbols and any flexible symbols of the slot format. In some examples, the validation rule component 1220 may determine that the number of downlink-compatible symbols in the slot format is equal to or greater than the maximum number of repetitions multiplied by a number of symbols in a multi-symbol CORESET of each of the one or more downlink repetition configurations. In some examples, the validation rule component 1220 may determine the number of downlink-compatible symbols in the slot format based on a number of consecutive downlink symbols and flexible symbols of the slot format. In some examples, the validation rule component 1220 may configure the UE to use time division DMRS bundling.

In some examples, the validation rule component 1220 may determine that the validation rule is satisfied based on the slot format having a number of downlink-compatible symbols sufficient to support the number of repetitions identified by the one or more downlink repetition configurations. In some examples, the validation rule component 1220 may determine that the number of downlink-compatible symbols in the slot format is equal to or greater than a maximum number of repetitions multiplied by a number of symbols in a multi-symbol CORESET of each of the one or more downlink repetition configurations. The repetitions component 1225 may transmit, to the UE, both the slot format configuration and the one or more downlink repetition configurations based on the verifying.

In some examples, the slot format configuration component 1210 may identify, for communication between the base station and a UE, a TDD slot format configuration that identifies a slot format that includes one or more downlink symbols within a slot. In some examples, the slot format configuration component 1210 may transmit, to the UE, a DCI message including a first slot format configuration.

In some examples, the repetition configuration component 1215 may identify, for communication between the base station and the UE, one or more downlink repetition configurations which identify a number of repetitions of a downlink control transmission. In some examples, the validation rule component 1220 may determine the number of repetitions and the slot format fail to satisfy a validation rule for monitoring, by the UE, the number of repetitions. In some examples, the validation rule component 1220 may determine the number of downlink-compatible symbols in the slot format is insufficient to support a maximum number of repetitions, where the maximum number of repetitions is identified by the UE. In some examples, the validation rule component 1220 may determine the number of downlink-compatible symbols in the slot format is insufficient to support the number of repetitions identified by the one or more downlink repetition configurations. In some examples, the repetitions component 1225 may refrain from transmitting, to the UE, both the slot format configuration and the one or more downlink repetition configurations based on the determining.

Figure 13:
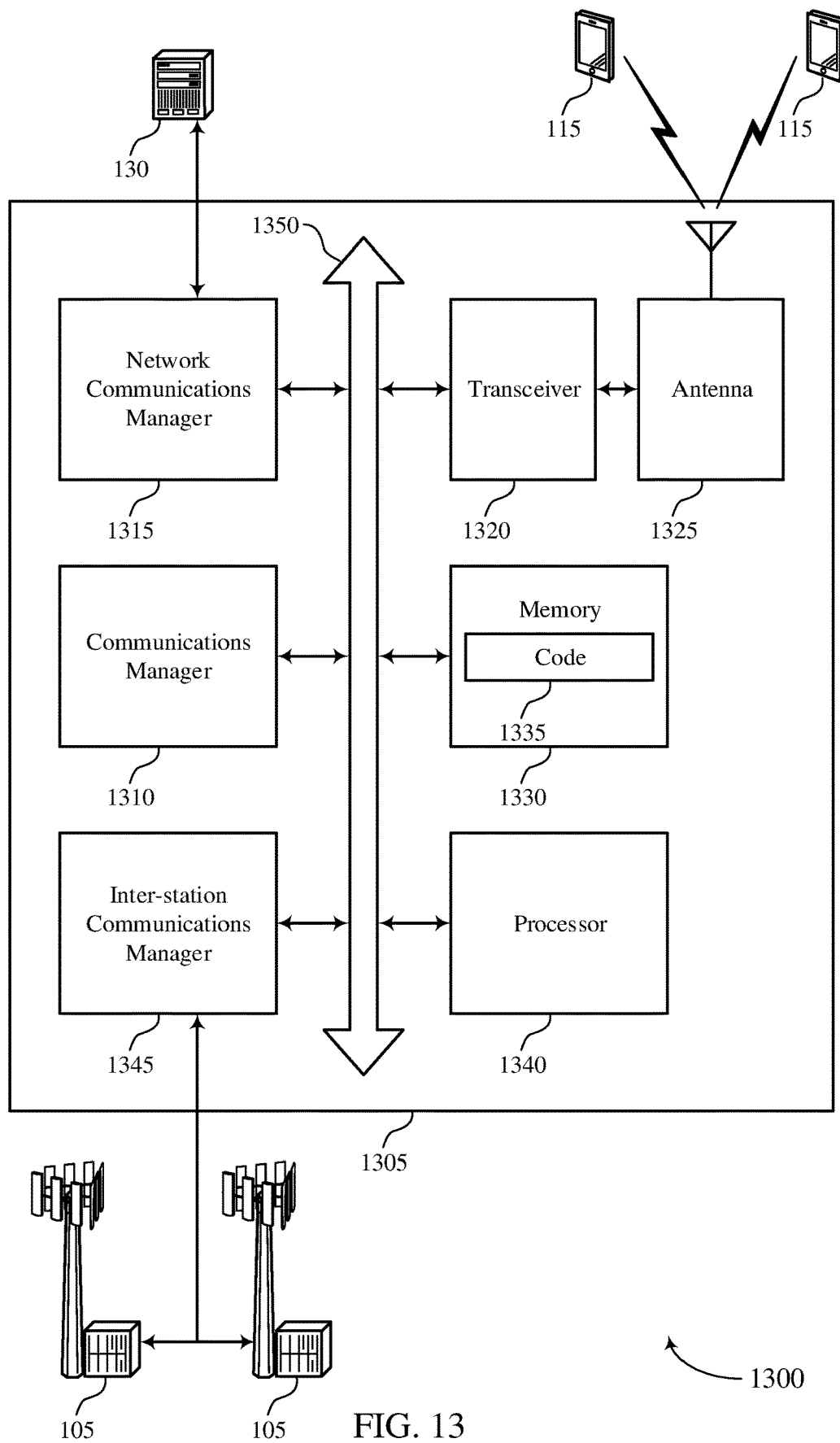
FIG. 13 shows a diagram of a system including a device that supports monitoring for downlink repetitions in accordance with aspects of the present disclosure.

FIG. 13 shows a diagram of a system 1300 including a device 1305 that supports monitoring for downlink repetitions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, verify that the number of repetitions and the slot format satisfy a validation rule for monitoring, by the UE, the number of repetitions, and transmit, to the UE, both the slot format configuration and the one or more downlink repetition configurations based on the verifying. Additionally or alternatively, the communications manager 1310 may identify, for communication between the base station and a UE, a TDD slot format configuration that identifies a slot format that includes one or more downlink symbols within a slot, identify, for communication between the base station and the UE, one or more downlink repetition configurations which identify a number of repetitions of a downlink control transmission, determine the number of repetitions and the slot format fail to satisfy a validation rule for monitoring, by the UE, the number of repetitions, and refrain from transmitting, to the UE, both the slot format configuration and the one or more downlink repetition configurations based on the determining.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting monitoring for downlink repetitions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
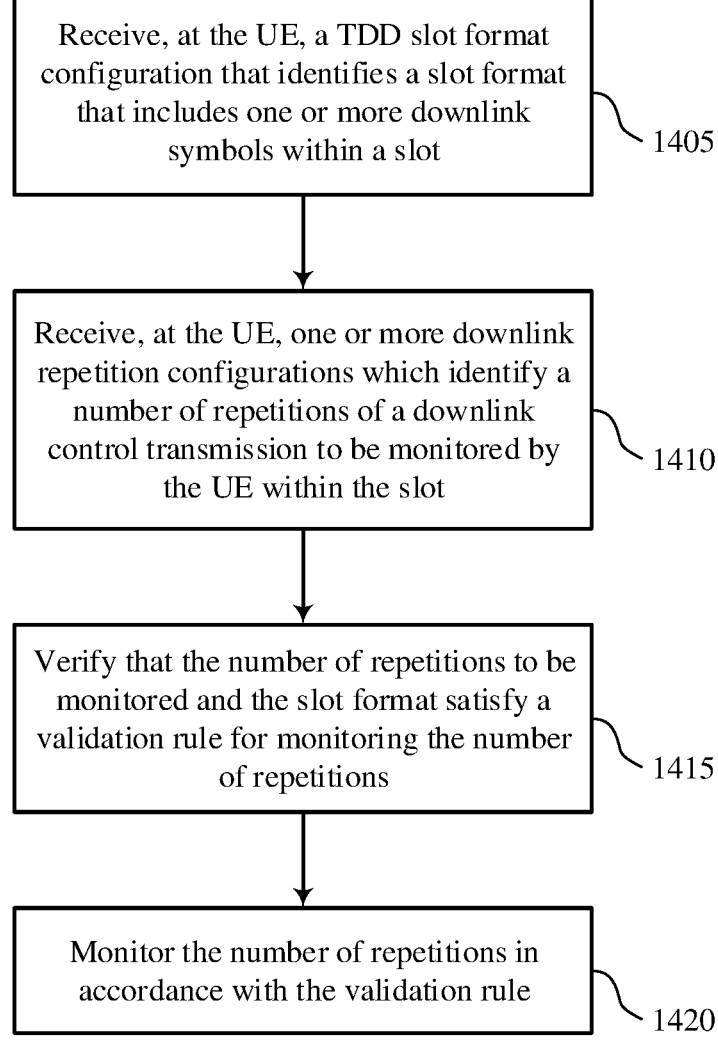

FIG. 14 shows a flowchart illustrating a method 1400 that supports monitoring for downlink repetitions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, at the UE, a TDD slot format configuration that identifies a slot format that includes one or more downlink symbols within a slot. The operations of 1405 may be performed according to the methods described herein. In some examples, aspects of the operations of 1405 may be performed by a slot format configuration component as described with reference to FIGS. 6 through 9.

At 1410, the UE may receive, at the UE, one or more downlink repetition configurations which identify a number of repetitions of a downlink control transmission to be monitored by the UE within the slot. The operations of 1410 may be performed according to the methods described herein. In some examples, aspects of the operations of 1410 may be performed by a repetition configuration component as described with reference to FIGS. 6 through 9.

At 1415, the UE may verify that the number of repetitions to be monitored and the slot format satisfy a validation rule for monitoring the number of repetitions. The operations of 1415 may be performed according to the methods described herein. In some examples, aspects of the operations of 1415 may be performed by a validation rule component as described with reference to FIGS. 6 through 9.

At 1420, the UE may monitor the number of repetitions in accordance with the validation rule. The operations of 1420 may be performed according to the methods described herein. In some examples, aspects of the operations of 1420 may be performed by a repetitions component as described with reference to FIGS. 6 through 9.

FIG. 15 shows a flowchart illustrating a method 1500 that supports monitoring for downlink repetitions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, at the UE, a TDD slot format configuration that identifies a slot format that includes one or more downlink symbols within a slot. The operations of 1505 may be performed according to the methods described herein. In some examples, aspects of the operations of 1505 may be performed by a slot format configuration component as described with reference to FIGS. 6 through 9.

At 1510, the UE may receive, at the UE, one or more downlink repetition configurations which identify a number of repetitions of a downlink control transmission to be monitored by the UE within the slot. The operations of 1510 may be performed according to the methods described herein. In some examples, aspects of the operations of 1510 may be performed by a repetition configuration component as described with reference to FIGS. 6 through 9.

At 1515, the UE may verify that the number of repetitions to be monitored and the slot format satisfy a validation rule for monitoring the number of repetitions. The operations of 1515 may be performed according to the methods described herein. In some examples, aspects of the operations of 1515 may be performed by a validation rule component as described with reference to FIGS. 6 through 9.

At 1520, the UE may determine that the validation rule is satisfied based on the slot format having a number of downlink-compatible symbols sufficient to support a maximum number of repetitions, where the maximum number of repetitions is identified by the UE. The operations of 1520 may be performed according to the methods described herein. In some examples, aspects of the operations of 1520 may be performed by a validation rule component as described with reference to FIGS. 6 through 9.

At 1525, the UE may monitor the number of repetitions in accordance with the validation rule. The operations of 1525 may be performed according to the methods described herein. In some examples, aspects of the operations of 1525 may be performed by a repetitions component as described with reference to FIGS. 6 through 9.

Figure 16:
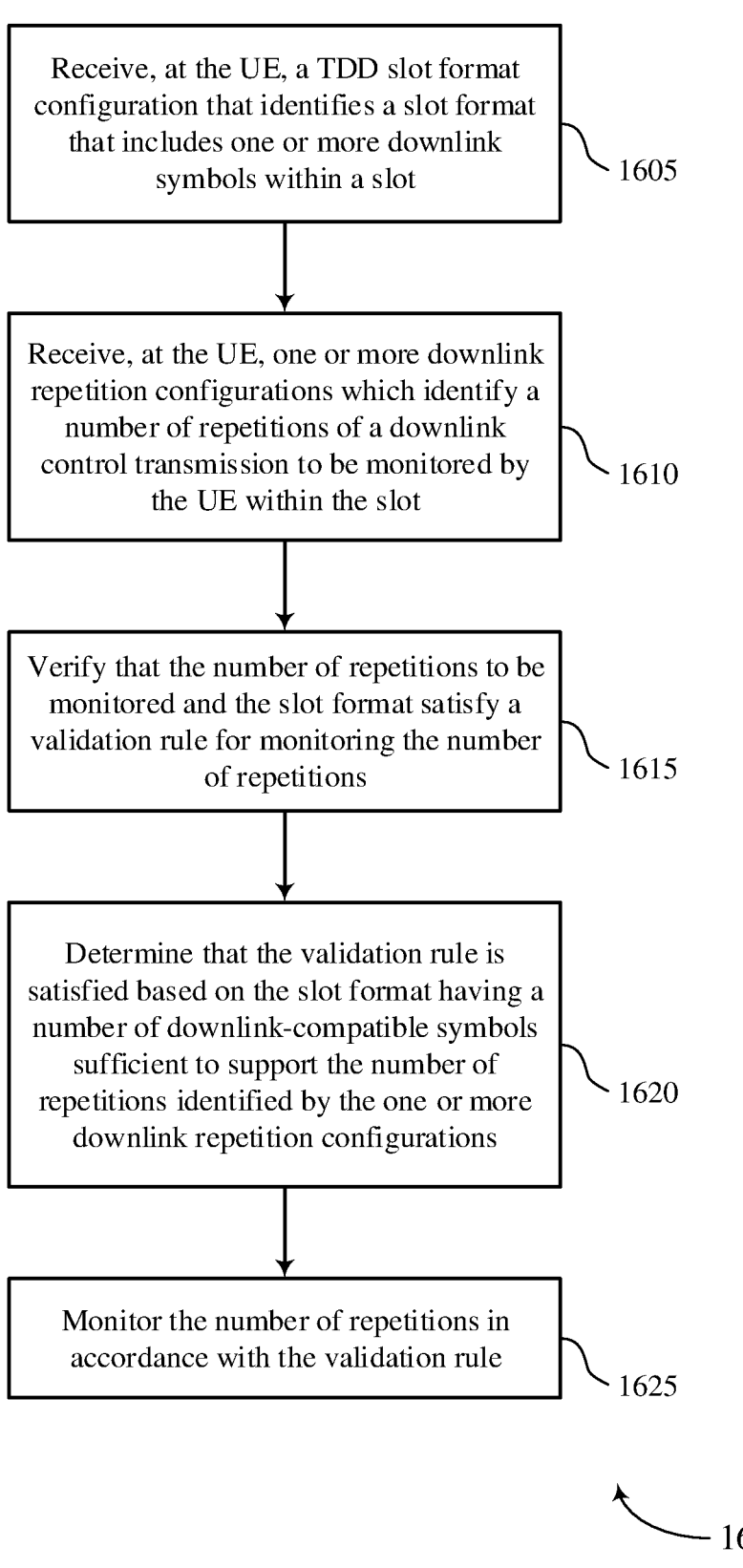

FIG. 16 shows a flowchart illustrating a method 1600 that supports monitoring for downlink repetitions in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, at the UE, a TDD slot format configuration that identifies a slot format that includes one or more downlink symbols within a slot. The operations of 1605 may be performed according to the methods described herein. In some examples, aspects of the operations of 1605 may be performed by a slot format configuration component as described with reference to FIGS. 6 through 9.

At 1610, the UE may receive, at the UE, one or more downlink repetition configurations which identify a number of repetitions of a downlink control transmission to be monitored by the UE within the slot. The operations of 1610 may be performed according to the methods described herein. In some examples, aspects of the operations of 1610 may be performed by a repetition configuration component as described with reference to FIGS. 6 through 9.

At 1615, the UE may verify that the number of repetitions to be monitored and the slot format satisfy a validation rule for monitoring the number of repetitions. The operations of 1615 may be performed according to the methods described herein. In some examples, aspects of the operations of 1615 may be performed by a validation rule component as described with reference to FIGS. 6 through 9.

At 1620, the UE may determine that the validation rule is satisfied based on the slot format having a number of downlink-compatible symbols sufficient to support the number of repetitions identified by the one or more downlink repetition configurations. The operations of 1620 may be performed according to the methods described herein. In some examples, aspects of the operations of 1620 may be performed by a validation rule component as described with reference to FIGS. 6 through 9.

At 1625, the UE may monitor the number of repetitions in accordance with the validation rule. The operations of 1625 may be performed according to the methods described herein. In some examples, aspects of the operations of 1625 may be performed by a repetitions component as described with reference to FIGS. 6 through 9.

FIG. 17 shows a flowchart illustrating a method 1700 that supports monitoring for downlink repetitions in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, at the UE, a TDD slot format configuration that identifies a slot format that includes one or more downlink symbols within a slot. The operations of 1705 may be performed according to the methods described herein. In some examples, aspects of the operations of 1705 may be performed by a slot format configuration component as described with reference to FIGS. 6 through 9.

At 1710, the UE may receive, at the UE, one or more downlink repetition configurations which identify a number of repetitions of a downlink control transmission to be monitored by the UE within the slot. The operations of 1710 may be performed according to the methods described herein. In some examples, aspects of the operations of 1710 may be performed by a repetition configuration component as described with reference to FIGS. 6 through 9.

At 1715, the UE may determine the number of repetitions to be monitored and the slot format fail to satisfy a validation rule for monitoring the number of repetitions. The operations of 1715 may be performed according to the methods described herein. In some examples, aspects of the operations of 1715 may be performed by a validation rule component as described with reference to FIGS. 6 through 9.

At 1720, the UE may refrain from monitoring the number of repetitions based on the determining. The operations of 1720 may be performed according to the methods described herein. In some examples, aspects of the operations of 1720 may be performed by a repetitions component as described with reference to FIGS. 6 through 9.

FIG. 18 shows a flowchart illustrating a method 1800 that supports monitoring for downlink repetitions in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify, for communication between the base station and a UE, a TDD slot format configuration that identifies a slot format that includes one or more downlink symbols within a slot. The operations of 1805 may be performed according to the methods described herein. In some examples, aspects of the operations of 1805 may be performed by a slot format configuration component as described with reference to FIGS. 10 through 13.

At 1810, the base station may identify, for communication between the base station and the UE, one or more downlink repetition configurations which identify a number of repetitions of a downlink control transmission. The operations of 1810 may be performed according to the methods described herein. In some examples, aspects of the operations of 1810 may be performed by a repetition configuration component as described with reference to FIGS. 10 through 13.

At 1815, the base station may verify that the number of repetitions and the slot format satisfy a validation rule for monitoring, by the UE, the number of repetitions. The operations of 1815 may be performed according to the methods described herein. In some examples, aspects of the operations of 1815 may be performed by a validation rule component as described with reference to FIGS. 10 through 13.

At 1820, the base station may transmit, to the UE, both the slot format configuration and the one or more downlink repetition configurations based on the verifying. The operations of 1820 may be performed according to the methods described herein. In some examples, aspects of the operations of 1820 may be performed by a repetitions component as described with reference to FIGS. 10 through 13.

FIG. 19 shows a flowchart illustrating a method 1900 that supports monitoring for downlink repetitions in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may identify, for communication between the base station and a UE, a TDD slot format configuration that identifies a slot format that includes one or more downlink symbols within a slot. The operations of 1905 may be performed according to the methods described herein. In some examples, aspects of the operations of 1905 may be performed by a slot format configuration component as described with reference to FIGS. 10 through 13.

At 1910, the base station may identify, for communication between the base station and the UE, one or more downlink repetition configurations which identify a number of repetitions of a downlink control transmission. The operations of 1910 may be performed according to the methods described herein. In some examples, aspects of the operations of 1910 may be performed by a repetition configuration component as described with reference to FIGS. 10 through 13.

At 1915, the base station may determine the number of repetitions and the slot format fail to satisfy a validation rule for monitoring, by the UE, the number of repetitions. The operations of 1915 may be performed according to the methods described herein. In some examples, aspects of the operations of 1915 may be performed by a validation rule component as described with reference to FIGS. 10 through 13.

At 1920, the base station may refrain from transmitting, to the UE, both the slot format configuration and the one or more downlink repetition configurations based on the determining. The operations of 1920 may be performed according to the methods described herein. In some examples, aspects of the operations of 1920 may be performed by a repetitions component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example process that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:

receiving a time division duplex slot format configuration that identifies a slot format that includes one or more downlink symbols within a slot;

receiving one or more downlink repetition configurations that identify a quantity of repetitions of a downlink control transmission to be monitored by the UE within the slot wherein the quantity of the identified repetitions to be monitored and the slot format do not satisfy a validation rule for monitoring the quantity of repetitions; and refraining from monitoring the quantity of repetitions based at least in part the validation rule not being satisfied.

2. The method of claim 1, wherein:

the quantity of repetitions to be monitored and the slot format do not satisfy the validation rule because a quantity of downlink-compatible symbols in the slot format is insufficient to support a maximum quantity of repetitions, wherein the maximum quantity of repetitions is identified by the UE.

3. The method of claim 1, wherein:

the quantity of repetitions to be monitored and the slot format do not satisfy the validation rule because the quantity of downlink-compatible symbols in the slot format is insufficient to support the quantity of repetitions identified by the one or more downlink repetition configurations.

4. The method of claim 1, wherein:

the slot format configuration is a second slot format configuration; and the quantity of repetitions and the slot format do not satisfy the validation rule because a first slot format configuration dynamically received as a replacement of a previously received slot format configuration has more downlink-compatible symbols than in the previously received slot format configuration, wherein the first slot format configuration is comprised in a downlink control message received from a base station.

5. A user equipment (UE), comprising:

a transceiver;

a processor; and memory storing instructions that are executable by the processor to cause the UE to:

receive, via the transceiver, a time division duplex slot format configuration that identifies a slot format that includes one or more downlink symbols within a slot;

receive, via the transceiver, one or more downlink repetition configurations that identify a quantity of repetitions of a downlink control transmission to be monitored within the slot, wherein the quantity of repetitions to be monitored and the slot format do not satisfy a validation rule for monitoring the quantity of repetitions; and refrain from monitoring the quantity of repetitions based at least in part on the validation rule not being satisfied.

6. The UE of claim 5, wherein the quantity of repetitions to be monitored and the slot format do not satisfy the validation rule because a quantity of downlink-compatible symbols in the slot format is insufficient to support an identified maximum quantity of repetitions.

7. The UE of claim 5, wherein the quantity of repetitions to be monitored and the slot format do not satisfy the validation rule because a quantity of downlink-compatible symbols in the slot format is insufficient to support the quantity of repetitions identified by the one or more downlink repetition configurations.

8. The UE of claim 5, wherein:

the slot format configuration is a second slot format configuration; and the quantity of repetitions to be monitored and the slot format do not satisfy the validation rule because a first slot format configuration dynamically received as a replacement of a previously received slot format configuration has more downlink-compatible symbols than in the previously received slot format configuration, wherein the first slot format configuration is comprised in a downlink control message obtained from a base station.

* * * * *